United States Patent [19]

Tanaka

[11] Patent Number: 4,507,770
[45] Date of Patent: Mar. 26, 1985

[54] CONTROL SYSTEM FOR A DISC PLAYER APPARATUS

[75] Inventor: Toshio Tanaka, Gunma, Japan

[73] Assignee: Tokyo Shibaura Denki Kabushiki Kaisha, Japan

[21] Appl. No.: 416,068

[22] Filed: Sep. 8, 1982

[30] Foreign Application Priority Data

Sep. 11, 1981 [JP] Japan .................. 56-135223[U]

[51] Int. Cl.³ .................. G11B 1/00; G11B 25/04
[52] U.S. Cl. .................. 369/77.2; 369/264
[58] Field of Search .................. 369/77.2, 319, 320, 369/321, 362, 364; 360/97, 99, 133

[56] References Cited

U.S. PATENT DOCUMENTS

| 4,342,108 | 7/1982 | Kitamura et al. | 369/221 |
| 4,360,907 | 11/1982 | Yamamura | 369/77.2 |
| 4,390,979 | 6/1983 | Saito et al. | 369/270 |

FOREIGN PATENT DOCUMENTS

| 76518 | 4/1983 | European Pat. Off. |
| 2083268 | 3/1982 | United Kingdom |
| 2103863 | 2/1983 | United Kingdom |

Primary Examiner—Steven L. Stephan
Attorney, Agent, or Firm—Cushman, Darby & Cushman

[57] ABSTRACT

A control system for a disc player apparatus includes a lifter for ascending a disc placed thereon; a motor device for providing drive power which is used for effecting the ascension of the lifter; a clutch device coupled to the lifter and to the motor device for selectively transmitting the drive power to the lifter; a mechanism coupled to the lifter for causing the disc to be descended when the clutch device stops the transmission of the drive power; and an instruction logic for providing the motor device, with instructions. The motor device generates the drive power only when the instructions are provided.

The lifter has a sensor for providing the clutch device with a position signal for a given period of time when the lifter reaches a given position at which the disc placed on the lifter is lifted up. The clutch device transmits the drive power to the lifter when the position signal is provided. The clutch device stops the transmission of the drive power where the position signal and the instructions are not provided.

12 Claims, 29 Drawing Figures

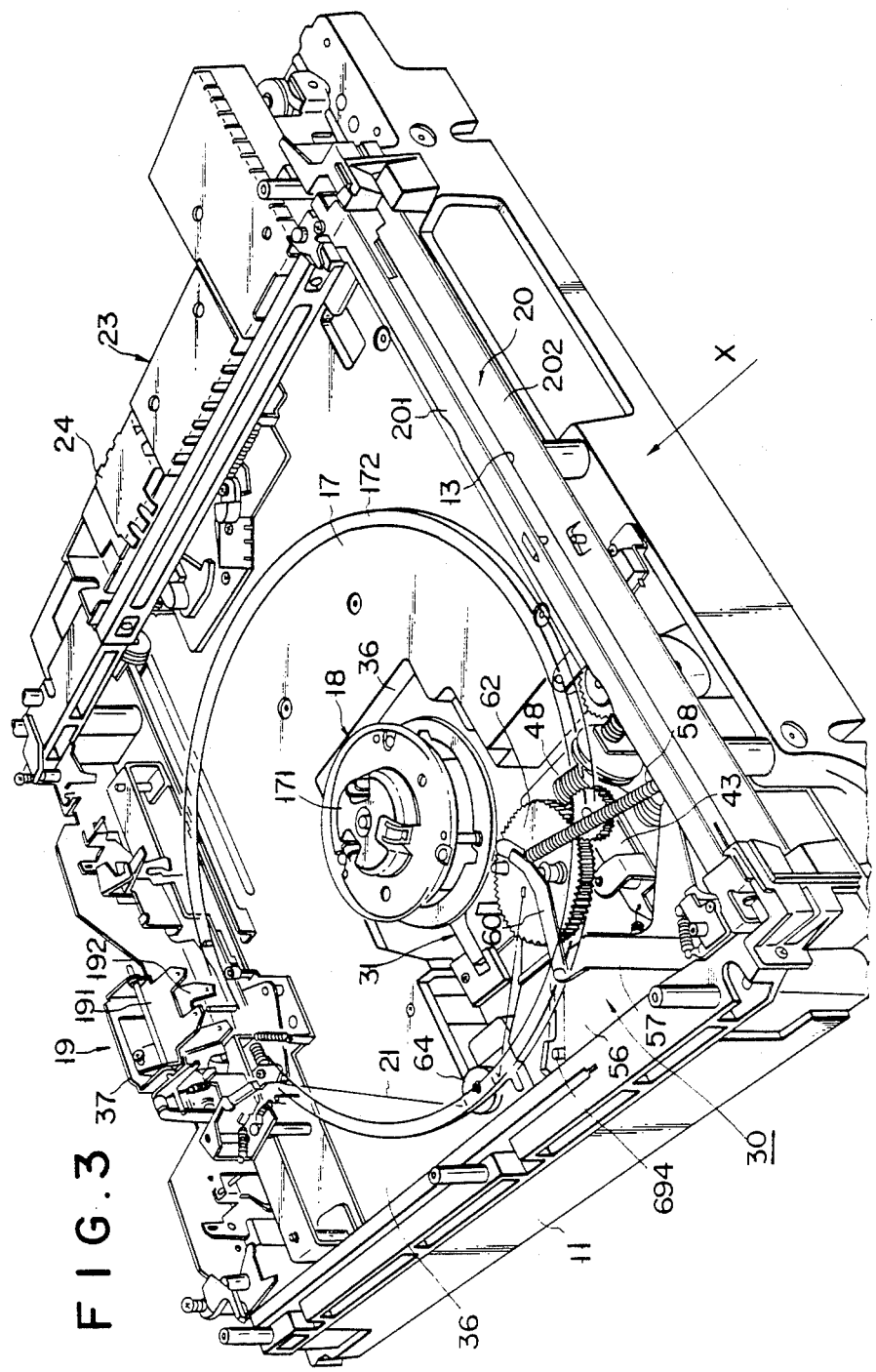

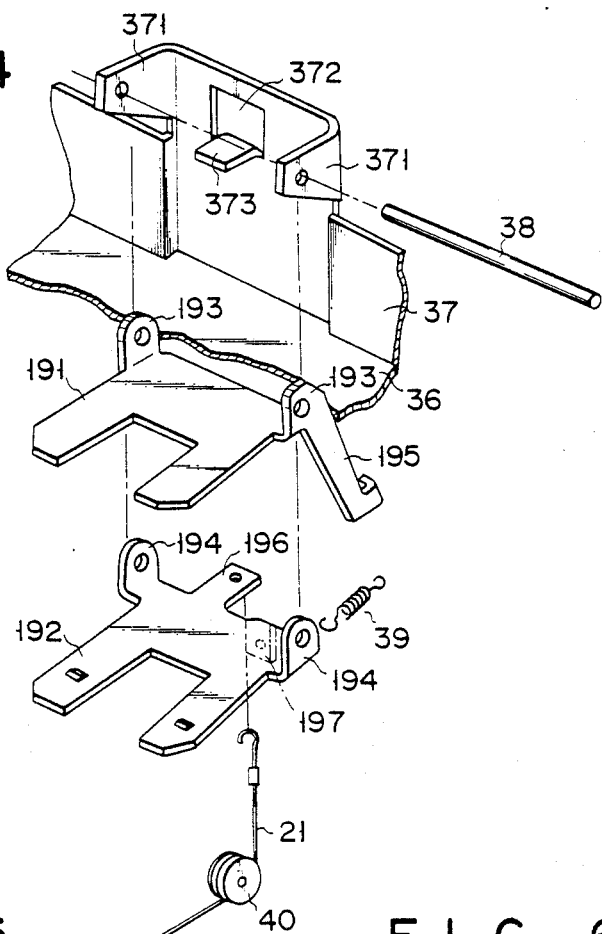
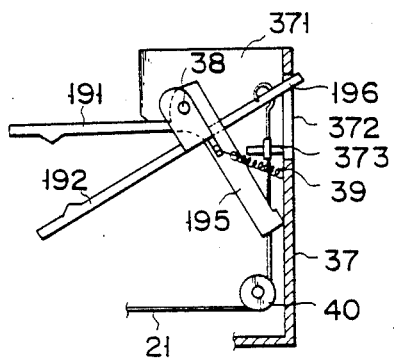
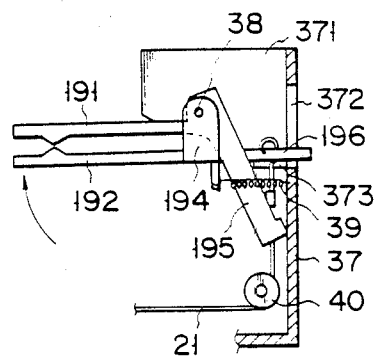

F I G . 1 3
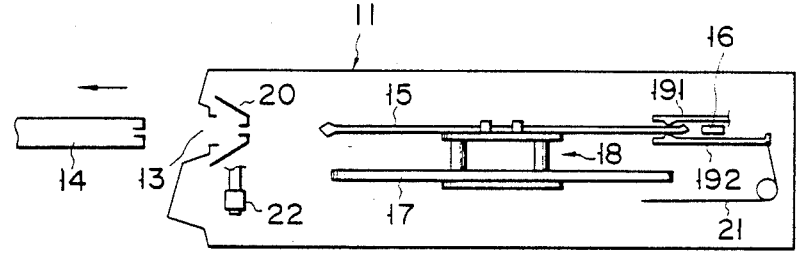
F I G . 1 4
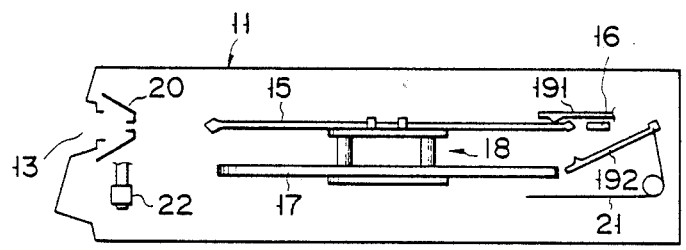
F I G . 1 5
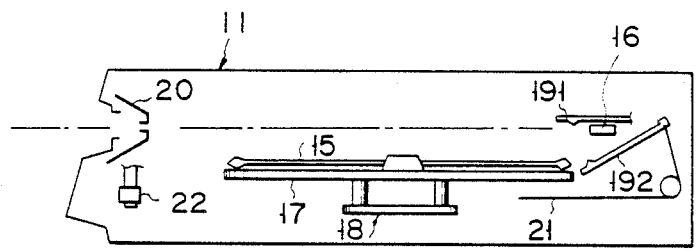

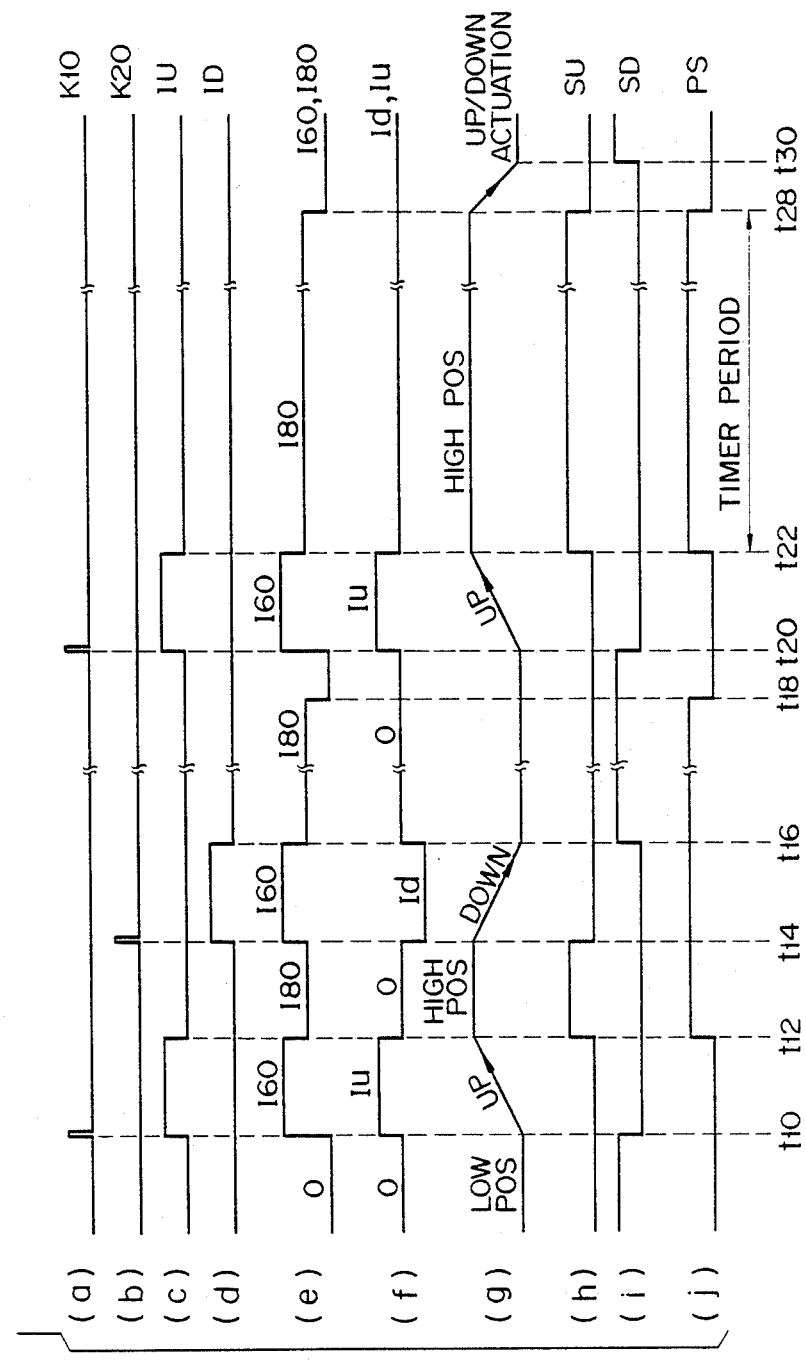

CONTROL SYSTEM FOR A DISC PLAYER APPARATUS

BACKGROUND OF THE INVENTION

This invention relates to a control system for a disc player apparatus in which a disc is placed on a turntable of the player by means of a disc lifter, and particularly to improvement of a clutch control system for selectively coupling drive power to the disc lifter.

In a certain disc player, e.g., in a video disc player, a disc to be played back is placed on a turntable of the player by means of a disc lifter. Thus, the disc is first put on the lifter in a disc set mode (disc receiving standby state). Then, in a playback mode, the lifter descends so that the disc is lowered onto the turntable, and the playback operation is commenced. Where the disc is to be taken off, the lifter ascends so that the disc is lifted from the turntable. Generally, the above-mentioned ascending/descending operation of the disc is performed by a mechanism comprising a reversible motor, a lifter (disc cradle), a transmission gear assembly for transmitting drive power of the motor to the lifter, and a clutch for selectively effecting the power transmission of the gear assembly. Whether or not the clutch enables the gear assembly to transmit the drive power is determined by a clutch solenoid. Thus, when the solenoid is electrically energized, the gear assembly transmits the drive power from the motor to the lifter. When a system power switch of the player apparatus is OFF, the solenoid is not energized, and the clutch is disabled so that the lifter automatically descends. In such mechanism, since the solenoid is always energized while the system power is ON, unavailing power consumption for the solenoid is inevitably invited. Further, if one forgets to turn the power of the ray or to the OFF position in the disc set mode, the disc is maintained in its raised state for a long period of time, and therefore the possibility exists that the disc may become warped resulting in a noticeable vibration of the disc plane, especially at the outer periphery of the disc plane, upon rotation of the disc. Such vibration due to the warped disk is quite unfavorable for a stable and reliable playback operation of the player.

SUMMARY OF THE INVENTION

It is accordingly an object of the present invention to provide a control system for a disc player apparatus which avoids unavailing power consumption of a clutch solenoid.

Another object of the invention is to provide a control system for a disc player apparatus which energizes the clutch solenoid only during a given period of time so that the disc is never maintained in its lifted state for a long period of time.

To achieve the above object, a control system for a disc player apparatus of the invention has a lifter for lifting (ascending/descending) a disc, a motor for generating drive power, a mechanical transmission having a clutch with a solenoid for transmitting the drive power to the lifter, and a mechanism for descending the lifter when the clutch does not permit the transmission of the drive power. Where the solenoid is so energized that the clutch transmits drive power of the motor to the lifter and the motor is actuated, the lifter ascends. When the lifter reaches to a given upper position at which a disc to be played back is received, a position sensor being coupled to the lifter detects the given upper position to generate a position signal. The position signal causes the solenoid to be energized for a given period of time which is generally several minutes at most. When the given period of time has elapsed the solenoid is deenergized and the clutch releases the transmission of the drive power so that the lifter descends irrespective of the ON/OFF state of system power of the player apparatus. Accordingly, the solenoid consumes electric power almost only during the given period of time, thereby avoiding unavailing power consumption of the solenoid. Further, since the clutch releases the transmission of drive power when the given period of time has elapsed, a disc placed on the lifter is never maintained in its lifted up state for a long period of time, even if a user forgets the power OFF of the player apparatus in a disc set mode or a disc receiving standby state to the OFF position.

BRIEF DESCRIPTION OF THE DRAWINGS

FIG. 3 is a perspective view schematically showing mechanisms inside a housing;

FIG. 4 is a disassembled perspective view extractively showing a holding device;

FIG. 5 is a side view of the holding device in the position not to hold a disc;

FIG. 6 is a side view of the holding device in the position to hold the disc;

FIGS. 7 to 15 are schematic side views for illustrating the operations of a disc cradle (lifter) and the holding device in association with several processes of insertion of the casing;

FIG. 29 is a timing chart useful for explaining operational sequence of the control system shown in FIGS. 27 and 28.

DETAILED DESCRIPTION OF THE PREFERRED EMBODIMENT

There will now be described in detail an embodiment of a clutch control system for a disc player apparatus according to the present invention with reference to the accompanying drawings.

First, the description will be given to the mechanical configuration of a disc player apparatus.

Figure 1:
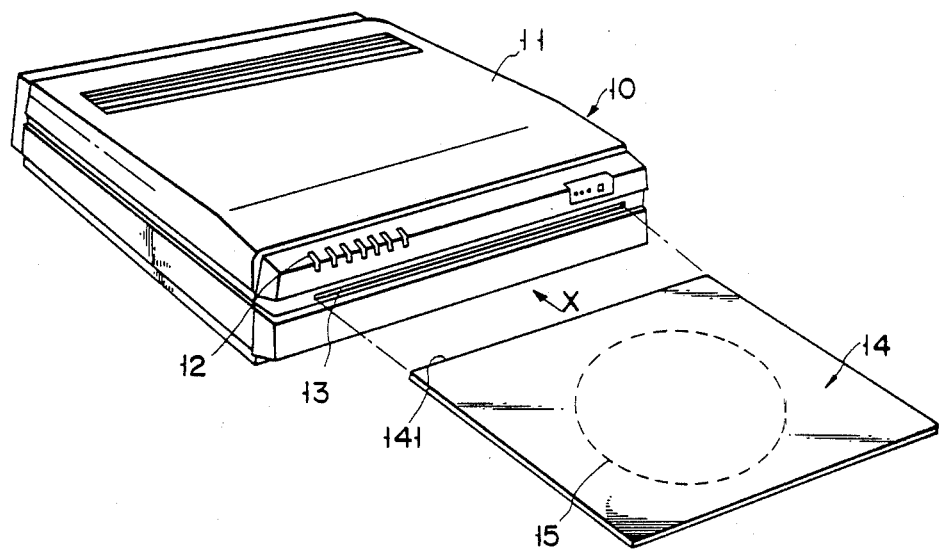
FIG. 1 is a perspective view showing one embodiment of the mechanism part of a disc player apparatus according to the invention along with a casing.
Figure 2:
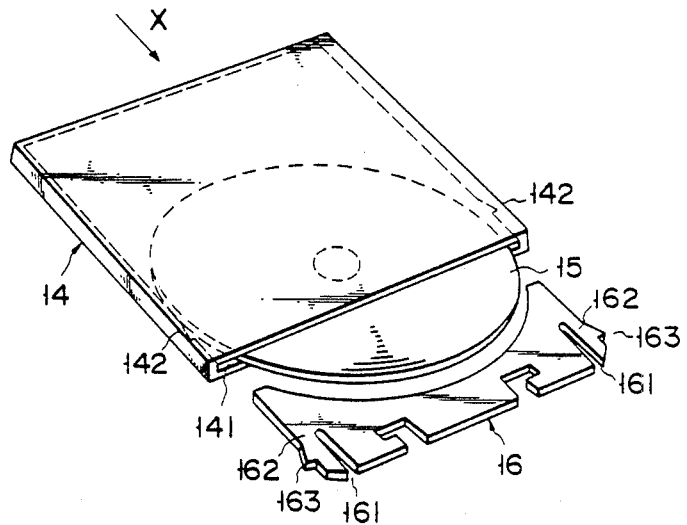
FIG. 2 is a perspective view showing the casing along with a disc and a lid plate.

As shown in FIG. 1, a disc player apparatus (hereinafter referred to as player) 10 is provided with a housing 11. Attached to one side edge of the upper surface of housing 11 are a plurality of operating buttons (manipulation keys) 12 for setting various operation modes. Formed in one lateral face of housing 11 is an inlet slot 13 through which a casing 14 (mentioned later) is inserted into housing 11 along a casing insertion direction X. In FIG. 2, casing 14 is in the form of a thin and hollow box with an opening 141 in one lateral face thereof. A disc 15 is inserted through opening 141 into casing 14 in the opposite direction to insertion direction X. A lid plate 16 is detachably fitted to opening 141. When lid plate 16 is fitted in opening 141, lid plate 16 blocks opening 141 so that disc 15 housed in casing 14 is not slipped out of opening 141.

Formed at both side portions of lid plate 16 along insertion direction X are a pair of slits 161 which extend over a predetermined length along the opposite direction to insertion direction X. Each slit 161 defines an elastic strip 162 on each side of lid plate 16. An outwardly projected click 163 is formed at the middle portion of each elastic strip 162. A slant face is formed at the tip end of each elastic strip 162. As shown in FIG. 2, click 163 has an engaging surface to intersect insertion direction X at right angles and a pressing surface sloping outward along insertion direction X. An engaging groove 142 capable of receiving each corresponding click 163 of lid plate 16 is formed in that portion of each inner lateral face of casing 14 defining the inside space thereof. Each groove 142 faces click 163 when lid plate 16 is entirely housed in casing 14.

Projections (not shown) are formed at the substantially central portions of the upper and lower surfaces of the front end portion of lid plate 16, severally. A penetrating hole (not shown) capable of receiving each corresponding projection of lid plate 16 is formed in that portion of each bottom face of casing 14 defining the inside space thereof which faces the projection when lid plate 16 is entirely housed in casing 14.

The disc 15 is housed in casing 14 in the following manner so as to prevent manual removal of casing 14. First, disc 15 is inserted into empty casing 14 through opening 141. Then, lid plate 16 is inserted into casing 14 to block opening 141. When clicks 163 touch both end edge portions of opening 141, respectively, in the middle of the insertion of lid plate 16, both elastic strips 162 are pushed inward as the pressing surfaces of their respective clicks 163 engage the edge portions, and lid plate 16 is further inserted into casing 14. The moment the lid plate 16 is fully inserted into casing 14, clicks 163 of lid plate 16 are caused to be fitted in their corresponding engaging grooves 142 of casing 14 by the resilience of elastic strips 162, and the projections (not shown) of lid plate 16 engage their corresponding penetrating holes (not shown) of casing 14. Thus, the locked state of lid plate 16 to casing 14 ceases. In the locked state, opening 141 of casing 14 is entirely closed, thereby preventing disc 15 from becoming soiled, such as by dust entering into casing 14.

In FIG. 3, a turntable 17 is rotatably set in housing 11. Turntable 17 is rotated by a drive mechanism (not shown) with the aid of a belt transmission (not shown). A center spindle 171 is formed at the central portion of turntable 17, and a ridge 172 is formed throughout the outer peripheral portion of the surface of turntable 17. Ridge 172 corresponds to an annular non-recording portion formed at the outer peripheral portion of disc 15 laid on turntable 17. Namely, the upper surface of ridge 172 is defined as a disc loading surface.

A disc cradle 18 which is permitted to move vertically is disposed at the central portion of turntable 17. Cradle 18 is driven by an up-and-down mechanism 31, as described in detail later, to move vertically between a given position (a first position) to receive disc 15 held by a holding device 19 (mentioned later) and located above the disc loading surface of turntable 17 and another given position (a second position) below the disc loading surface of turntable 17 to allow the received disc 15 to be placed onto turntable 17. Inside the housing 11 surrounding inlet slot 13, as schematically shown in FIG. 3, there is provided an opening mechanism 20 for widening opening 141 of casing 14 inserted through inlet slot 13 to disengage the projections from the penetrating holes. Opening mechanism 20 includes upper and lower lid members 201 and 202 aligned with casing inlet slot 13. Lid members 201 and 202 enable to open casing inlet slot 13 when casing 14 is inserted. As casing 14 is inserted deeper, lid members 201 and 202 rock toward the inside of housing 11 to widen opening 141 of casing 14. Opening mechanism 20 is allowed to move as a whole within housing 11. Namely, as casing 14 is inserted into or drawn out from housing 11, opening mechanism 20 can be moved, with opening 141 of casing 14 kept open, between a position (a third position) at the back of inlet slot 13 and a position (a fourth position) at the innermost part of housing 11 as viewed along the insertion direction X. Opening mechanism 20 is fitted with a roller 22 moving together therewith and capable of engaging a cam lever 56 of a drive mechanism 30 as mentioned later.

The holding device 19 is disposed at the innermost part of housing 11 and is flush with inlet slot 13. Holding device 19 unlocks lid plate 16 from casing 14 and holds lid plate 16 and disc 15 when casing 14 containing disc 15 therein and having its opening 141 closed by lid plate 16 is inserted into housing 11 through inlet slot 13. The inserted end of casing 14 is located at the innermost part of housing 11, and only disc 15 is made free according to a playback instruction. Disc 15 is again held after the completion of the playback operation, and lid plate 16 as well as disc 15 is released, and then lid plate 16 is locked to casing 14 when empty casing 14 is inserted into housing 11. In holding disc 15, holding device 19 grasps the annular non-recording portion at the outer peripheral portion of disc 15 on both sides.

In FIG. 4, holding device 19 includes two fingers 191 and 192 arranged vertically. The upper and lower fingers 191 and 192 are each provided with a parallel pair of lugs 193 and 194, respectively. An extended strip 195 integrally extends obliquely downward from one of lugs 193 of upper finger 191. Extended strip 195 functions as a stopper. Formed on the rear end edge of lower finger 192 is a tongue 196 extending backward or in the insertion direction X and a bent strip 197 hanging downward. A penetrating hole is bored through each of lugs 193 and 194.

To support the upper and lower fingers 191 and 192, an auxiliary chassis 37 rises from the innermost part of a chassis 36 of housing 11. Formed on auxiliary chassis 37 are a pair of support strips 371 for supporting upper and lower fingers 191 and 192 together. Support strips 371 are so located as to face casing inlet slot 13. An opening 372 is formed in that portion of auxiliary chassis 37 which lies between the pair of support strips 371, and a receiving portion 373 extends from the lower end edge of opening 372 toward the interior of housing 11. A penetrating hole is bored through each support strip 371.

Upper and lower fingers 191 and 192 are pivotally supported on the pair of support strips 371 with a common shaft 38 passed through the holes in support strips 371. Namely, lower finger 192 is allowed to pivot between a position (a fifth position) where it is held substantially horizontal and a position (a sixth position) which is reached when lower finger 192 in the fifth position is pivoted counterclockwise through a predetermined angle around shaft 38. Lower finger 192 can support the lower surface of disc 15 when it is in the fifth position, and does not when in the sixth position. As for upper finger 191, it is allowed to move between a position (a seventh position) where disc 15 and lid plate 16 are allowed to be inserted between upper finger 191 and lower finger 192 when lower finger 192 is in the fifth position, and a position (an eighth position) where disc 15 located between upper finger 191 and lower finger 192 in the fifth position is seized tight and held irremovably. A spring 39 is stretched between bent strip 197 of lower finger 192 and auxiliary chassis 37. Spring 39 urges lower finger 192 to pivot counterclockwise or from the fifth position to the sixth. Namely, spring 39 causes lower finger 192 to be located in the sixth position where lower finger 192 is inclined at a predetermined angle to upper finger 191 in the absence of any external force on lower finger 192, as shown in FIG. 5. The sixth position of lower finger 192 is defined as the upper surface of tongue 196 running against the upper end edge of opening 372 of auxiliary chassis 37.

Tongue 196 of lower finger 192 is connected with one end of a wire 21. Wire 21 is connected to drive mechanism 30 by way of a pulley 40. Drive mechanism 30, which is to be described in detail later, pulls wire 21 except when it lowers cradle 18 under the condition that disc 15 on cradle 18 should be laid or landed on turntable 17. Thus, only while cradle 18 is descending under such condition, wire 21 is not pulled, so that lower finger 192 is pivoted downward by the urging force of spring 39 to be held in the sixth position, as shown in FIG. 5. Except while cradle 18 is descending under the aforesaid condition, wire 21 is pulled by drive mechanism 30, so that lower finger 192 is pivoted upward against the urging force of spring 39 to be held in the fifth position in close vicinity to upper finger 191, as shown in FIG. 6. The fifth position of lower finger 192 is defined as tongue 196 abuts on receiving portion 373.

Upper finger 191 is connected with a pressing mechanism (not shown in detail) for pressing upper finger 191 toward lower finger 192 to shift upper finger 191 from the seventh position to the eighth position so that disc 15 may be held between two fingers 191 and 192 when its peripheral portion is inserted between them.

In FIG. 3, a pickup arm 23 is disposed above turntable 17 within housing 11 so as to be able to move along the direction to intersect the insertion direction X at right angles. Pickup arm 23 is provided with a cartridge 24, and a reproducing stylus (not shown) is attached to the lower surface of cartridge 24. When the reproducing stylus slidably contacts disc 15 laid on turntable 17, information recorded on disc 15 is read out through the stylus. Pickup arm 23 is driven by a drive mechanism (not shown).

Referring now to FIGS. 7 to 15, there will be described the manner in which the disc 15 is placed onto the turntable 17.

Figure 7:
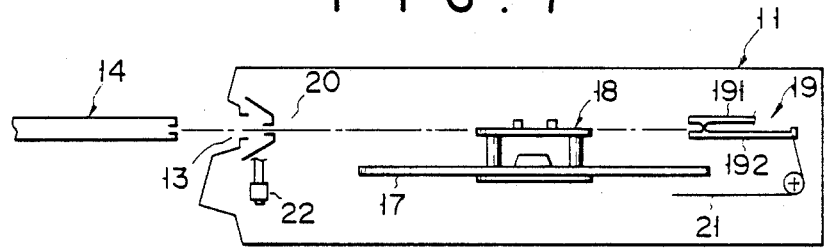

As shown in FIG. 7, casing 14 containing disc 15 and having opening 141 closed by lid plate 16 is inserted into housing 11 through inlet slot 13. Hereupon, when player 10 is supplied with power, disc cradle 18 is held in the first position to receive the inserted disc 15, and upper and lower fingers 191 and 192 of holding device 19 are brought close to each other to be ready to receive disc 15 and lid plate 16. As for opening mechanism 20, it is held in the third position just behind inlet slot 13. Upper and lower fingers 191 and 192 are held in the seventh and fifth positions, respectively.

Figure 8:
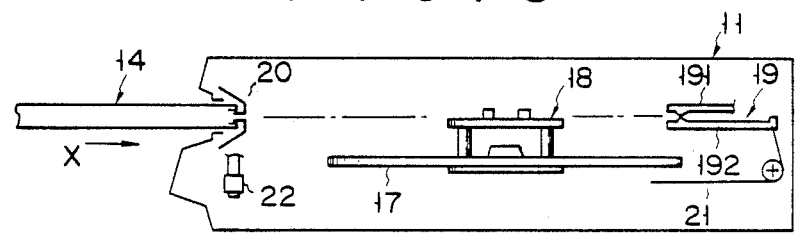
Figure 9:
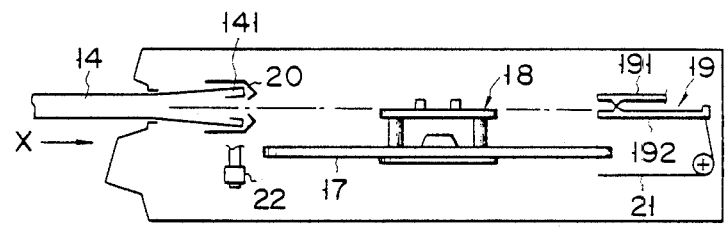
Figure 10:
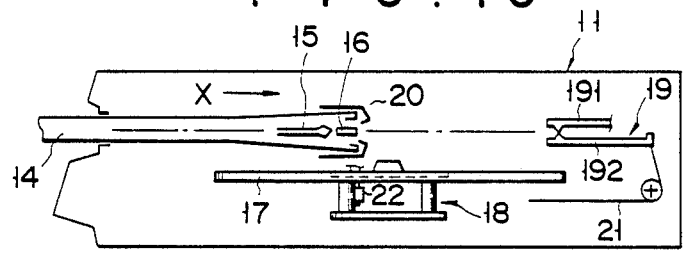

When casing 14 is inserted through inlet slot 13, opening mechanism 20 engages opening 141 of casing 14, as shown in FIG. 8. When casing 14 is inserted deeper, opening mechanism 20 widens opening 141 of casing 14, as shown in FIG. 9. Then, mechanism 20 moves from the third position toward the fourth position as casing 14 is pushed in. As the inserted end of casing 14 approaches cradle 18, cradle 18 descends to the second position, as shown in FIG. 10, lest it should prevent the insertion of casing 14.

Figure 11:
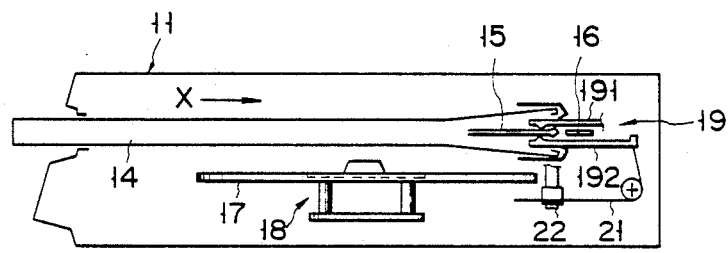

When casing 14 reaches the innermost part of housing 11, lid plate 16 and disc 15 inserted in casing 14 squeeze themselves between upper and lower fingers 191 and 192, as shown in FIG. 11. In this state, upper finger 191 is shifted from the seventh position to the eighth position as opening mechanism 20 reaches the fourth position, then disc 15 is held by holding device 19, and lid plate 16 is unlocked from casing 14 by a suitable mechanism (not shown) and held by holding device 19.

Figure 12:
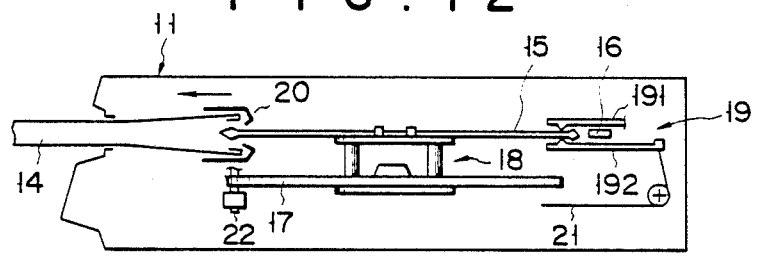

Thereafter, if casing 14 is pulled outward, only casing 14 itself will be taken out of housing 11 since both disc 15 and lid plate 16 are held by holding device 19. After casing 14 passes over cradle 18 in the second position, cradle 18 rises from the second position to the first position to receive disc 15 thereon, as shown in FIG. 12. After casing 14 is entirely removed from housing 11, up-and-down mechanism 31 starts its operation.

First, up-and-down mechanism 31 loosens wire 21 to shift lower finger 192 from the fifth position to the sixth position, as shown in FIG. 14, thereby causing holding device 19 to release its hold of disc 15. Thereafter, up-and-down mechanism 31 is driven by drive mechanism 30 to shift cradle 18 from the first position to the second position, and thus disc 15 is laid on turntable 17. When disc 15 is thus laid on turntable 17, player 10 is brought to a playback state. This state can be visibly recognized by an operator or user, for example, by illumination of a lamp. If the operator then pushes the operating button for the designation of playback, turntable 17 starts to rotate, and pickup arm 23 starts the movement to commence prescribed playback operation.

After completion of the playback operation, disc 15 is taken out of player 10 by inversely following the aforesaid processes of inserting operation, as a rule. If the operator pushes operating button 12 for disc unloading while keeping turntable 17 stopped and pickup arm 23 in a playback start position, then drive mechanism 30 operates so as first to raise cradle 18 from the second position to the first position, as shown in FIG. 14, thereby forcing disc 15 up to the first position, and then to pull wire 21 so that lower finger 192 is brought against the urging force of spring 39 to the fifth position, as shown in FIG. 13.

If empty casing 14 is inserted into housing 11, as in the state shown in FIG. 13, disc 15 is housed in casing 14 after going through the states shown in FIGS. 12, 11 and 10 in succession, and opening 141 of casing 14 is closed by lid plate 16. After successively going through the states shown in FIGS. 9, 8 and 7, casing 14 is removed from player 10.

Thus, the operator can set disc 15 on turntable 17 without directly touching disc 15. Hereupon, when a given period of time for keeping the state shown in FIG. 13 elapses, cradle 18 will automatically descend from the first position to the second position to allow disc 15 to be laid on turntable 17. Here, it is necessary to provide means for automatically setting disc 15 on turntable 17 when the power supply is terminated as in the state shown in FIG. 13. There will now be described an arrrangement to meet such need and to actualize the operation of cradle 18 illustrated with reference to FIGS. 7 to 15.

Figure 16:
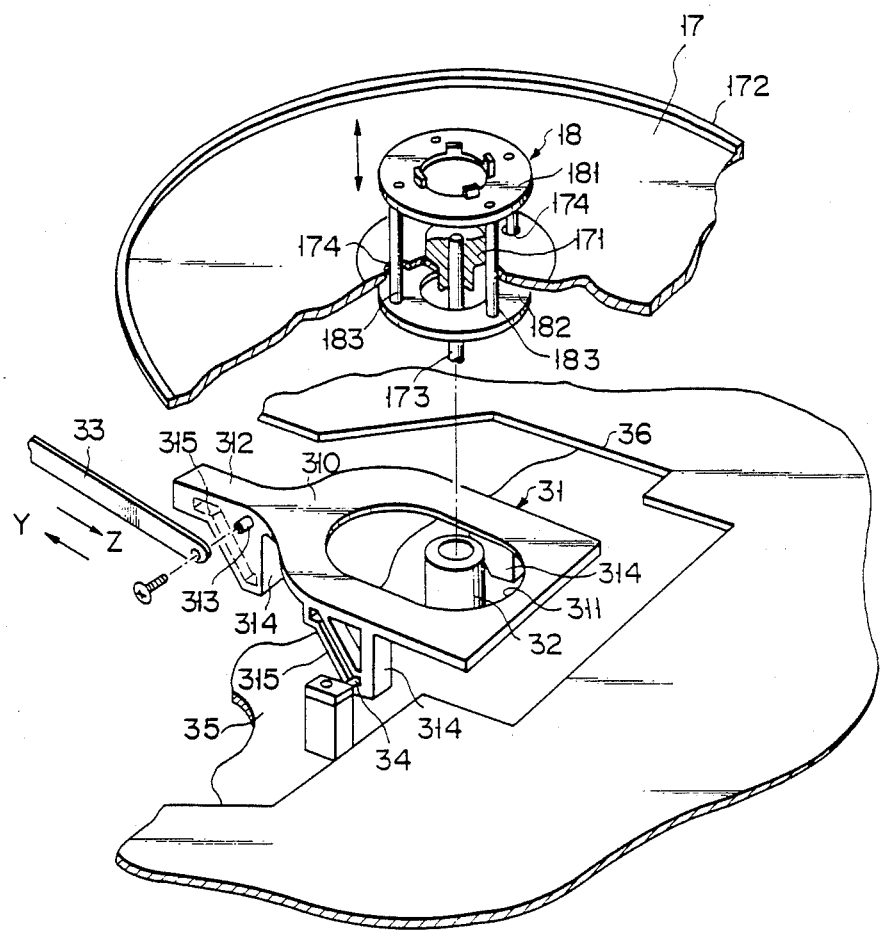
FIG. 16 is a perspective view partially in section showing the disc cradle and an up-and-down mechanism therefor.

In FIG. 16, turntable 17 has a rotating shaft 173 the upper end of which is fixed to the rotation center portion thereof. The lower end portion of rotating shaft 173 is rotatably supported by a bearing 32 located below main chassis 36. Cradle 18 attached to turntable 17 is provided with a pair of rings 181 and 182 between which the central portion of turntable 17 is sandwiched. A plurality of (four in this embodiment) penetrating holes 174 are concentrically formed at those portions of turntable 17 which are located around center spindle 171. A coupling rod 183 is loosely passed through each penetrating hole 174 along the vertical direction. Upper and lower rings 181 and 182 are coupled by means of coupling rods 183. The upper surface of upper ring 181 functions as a disc bearing surface to bear the lower surface of the central portion of disc 15. Thus, cradle 18 is allowed to move vertically relative to turntable 17. The respective thicknesses of upper ring 181 and ridge 172 are so set that the disc bearing surface of upper ring 181 is located below the disc loading surface of turntable 17 when the lower surface of upper ring 181 is in contact with the upper surface of turntable 17 and cradle 18 is in its lowest position or in the second position. Coupling rod 183 is long enough to raise the disc bearing surface of cradle 18 up to the first position.

Disposed below lower ring 182 of cradle 18 is the up-and-down mechanism 31 for raising and lowering cradle 18. Up-and-down mechanism 31 includes a slider 310, which is supported on an under chassis 35 so as to be able to move vertically and to reciprocate in the directions indicated by arrows Y and Z. Slider 310 is provided with an opening 311 through which rotating shaft 173 of turntable 17 is passed. Opening 311 has a shape of an elongated slot. Reciprocating of opening 311 in the directions indicated by the arrows Y and Z should run against rotating shaft 173.

A pin 313 protrudes from the lateral face of one end portion 312 of slider 310. One end of a coupling lever 33 is rotatably mounted on pin 313. The other end of coupling lever 33 is connected to drive mechanism 30. With the aid of lever 33, drive mechanism 30 moves slider 310 to a position (a ninth position) in the direction indicated by the arrow Y and to a position (a tenth position) in the direction indicated by the arrow Z. A plurality of (three in this embodiment) cam plates 314 are attached to the lower surface of slider 310. Each cam plate 314 has a cam groove 315 which slopes downward in the direction indicated by the arrow Z. A guide pin 34 fixed to under chassis 35 is fitted in cam groove 315.

Figure 17:
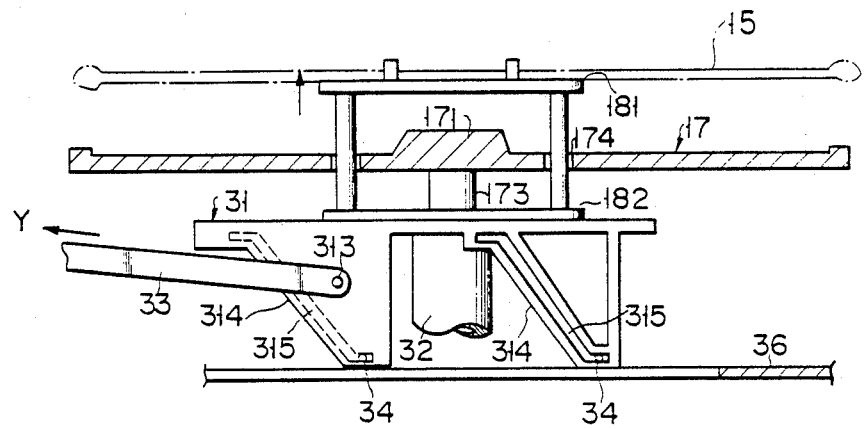
FIG. 17 is a side view showing the disc cradle located in a first position.
Figure 18:
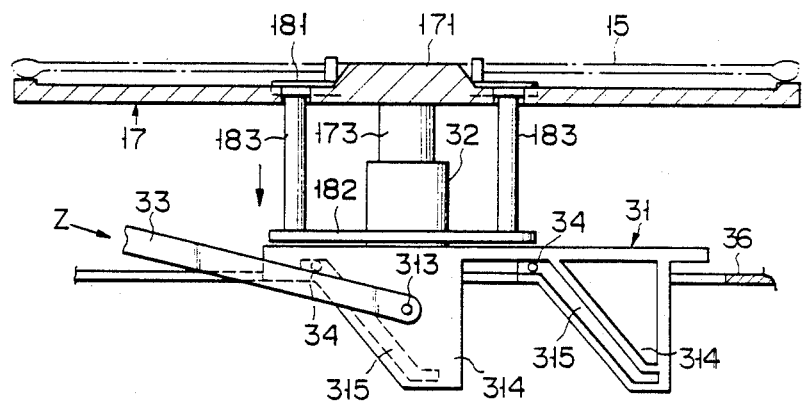
FIG. 18 is a side view showing the disc cradle located in a second position.

Since up-and-down mechanism 31 is constructed in this manner, slider 310 rises as shown in FIG. 17 when drive mechanism 30 moves lever 33 in the direction indicated by the arrow Y to locate slider 310 in the ninth position. As slider 310 rises, the upper surface of slider 310 strikes against the lower surface of lower ring 182 of cradle 18 to lift up cradle 18 to the first position. As drive mechanism 30 moves lever 33 in the direction indicated by the arrow Z to locate slider 310 in the tenth position, slider 310 descends as shown in FIG. 18. Accompanying such descent, cradle 18 is lowered to the second position by its own weight.

Referring now to FIGS. 19 to 26, the drive mechanism 30 will be described in detail.

Figure 19:
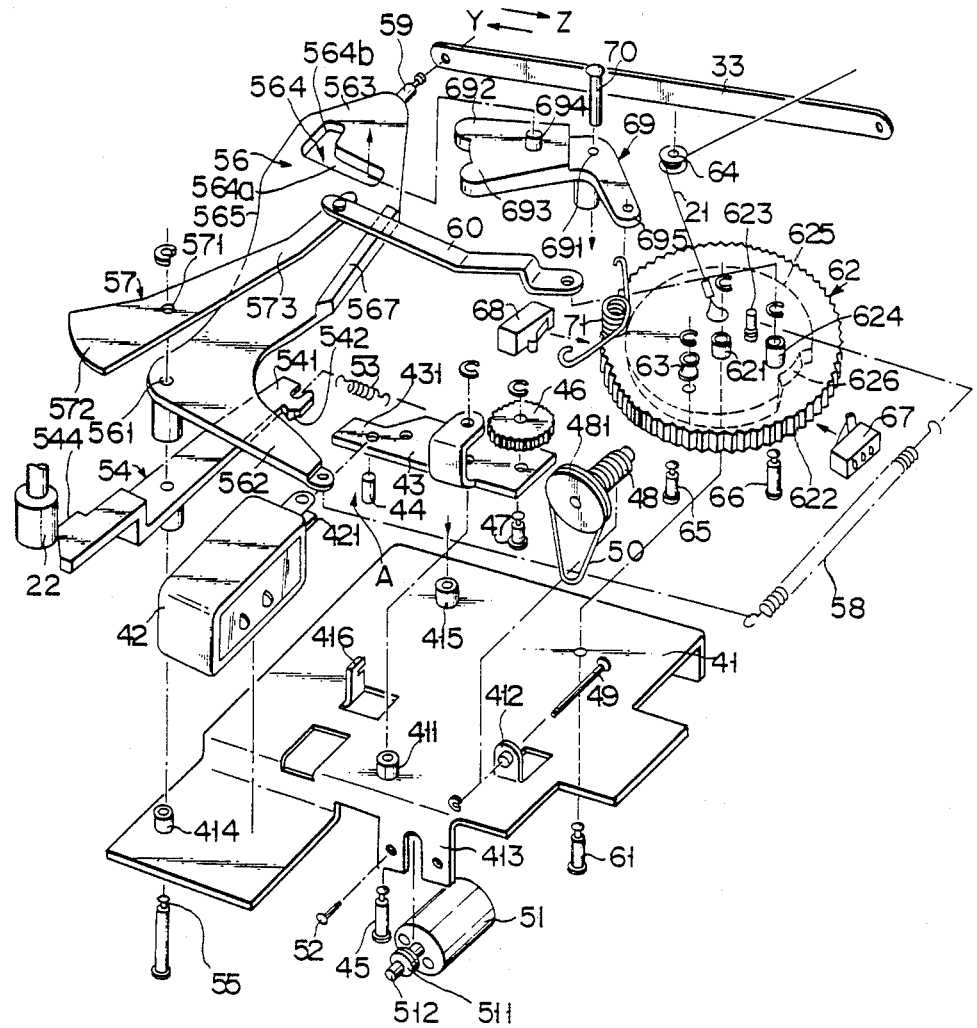
FIG. 19 is a disassembled perspective view extractively showing a drive mechanism of the disc cradle.
Figure 20:
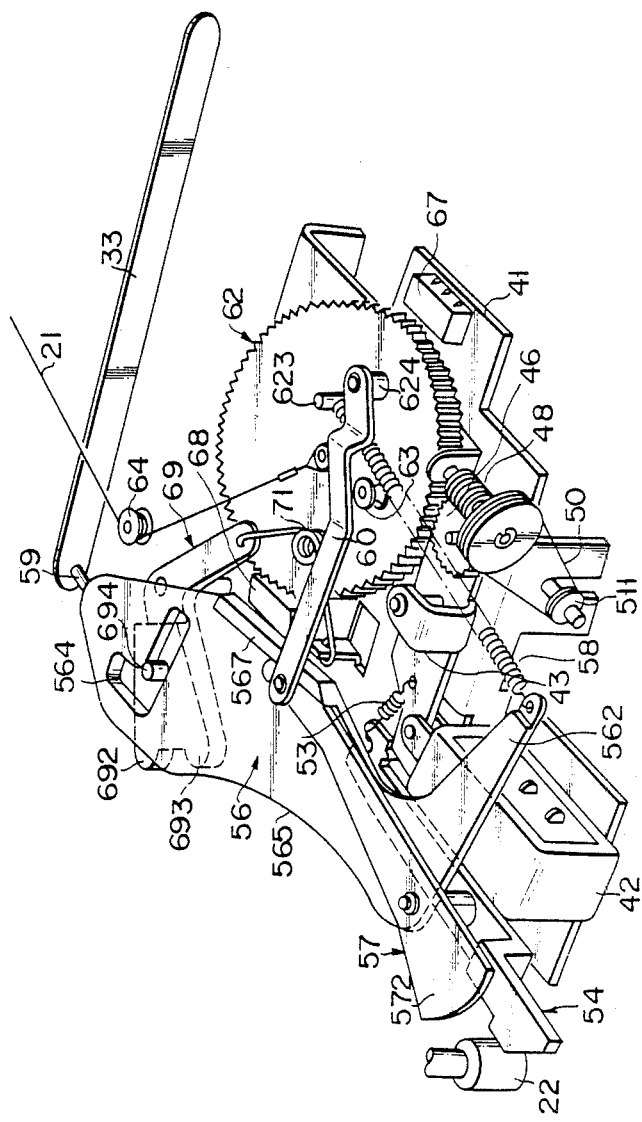
FIG. 20 is a perspective view showing an assembled state of the drive mechanism shown in FIG. 19.

As shown in FIGS. 19 and 20, drive mechanism 30 is provided with a mounting chassis 41 to be attached to main chassis 36. A solenoid 42 is fixed on mounting chassis 41. Solenoid 42 has a plunger 421 capable of moving in the axial direction thereof. When solenoid 42 is energized, plunger 421 is drawn in by a magnetic force to an eleventh position. When solenoid 42 is not energized, plunger 421 is projected from solenoid 42 to a twelfth position by the urging force of a spring 53 mentioned later. The distal end of plunger 421 is rotatably mounted on one end portion 431 of a solenoid lever 43 by means of a pin 44. The substantial central portion of solenoid lever 43 is rotatably mounted on mounting chassis 41 by menas of a pin 45. Pin 45 is supported by a bearing 411 attached to mounting chassis 41. A worm wheel 46 is rotatably mounted on the other end of solenoid lever 43 by means of a pin 47. Solenoid lever 43 is driven to rock around pin 45 as plunger 421 of solenoid 42 moves. Solenoid lever 43 and worm wheel 46 constitute a clutch mechanism A.

A worm 48 is provided in constant meshed engagement with the worm wheel 46. A pulley 481 is integrally formed at one end of worm 48 so as to be coaxial therewith. Worm 48 is rotatably mounted on mounting chassis 41 by means of a pin 49 which is attached to a raised strip 412 on mounting chassis 41. A reversible motor 51 is fixed by means of screws 52 to a bent portion 413 which is formed in that portion of the lower surface of mounting chassis 41. Chassis 41 is located substantially under worm 48. A pulley 511 is coaxialy fixed to a driving shaft 512 of motor 51. An endless belt 50 is stretched between pulley 481 of worm 48 and pulley 511 of driving shaft 512. Thus, when motor 51 drives driving shaft 512 to rotate, worm wheel 46 is rotated continually.

A lock lever 54 is pivotally mounted on mounting chassis 41 so as to be located beside solenoid 42. Lock lever 54 is supported at its substantially middle portion by means of a pin 55, which is rotatably supported by a bearing 414 fixed to mounting chassis 41. One end portion 541 of lock lever 54 extends close to one end portion 431 of solenoid lever 43 so that an engaging portion 542 formed at one end portion 541 of lock lever 54 can engage one end portion 431 of solenoid lever 43. In the engaged state, solenoid lever 43 is locked with plunger 421 of solenoid 42 kept in the eleventh position. A spring 53 is stretched between one end portion 541 of lock lever 54 and one end portion 431 of solenoid lever 43. Spring 53 urges solenoid lever 43 to rock from the eleventh position to the twelfth position. A cam portion 544 is formed at the other end portion of lock lever 54. Cam portion 544 is touched by roller 22 of opening mechanism 20 in the third position. In the touched state, lock lever 54 is pivoted in the counterclockwise direction of FIG. 19 against the urging force of spring 53, so that engaging portion 542 of lock lever 54 is disengaged from one end portion 431 of solenoid lever 43. In this state, if solenoid 42 is not energized, plunger 421 is held in the twelfth position by the urging force of spring 53.

A cam lever 56 and a stop lever 57 are also rockably mounted on pin 55 on which lock lever 54 is mounted pivotally. Cam lever 56 has a substantially L-shaped plane configuration, and is pivotally supported by pin 55 fitted in a penetrating hole 561 bored through its bent portion. One end portion 562 of cam lever 56 on the side of solenoid 42 is connected with one end of a tension spring 58 mentioned later. Tension spring 58 urges cam lever 56 to pivot counterclockwise. A pin 59 protrudes from the tip of the other end portion 563 of cam lever 56. The other end of coupling lever 33 is pivotally mounted on pin 59. Thus, coupling lever 33 is moved in the directions indicated by the arrows Y and Z as cam lever 56 rocks counterclockwise and clockwise, respectively, around pin 55.

A substantially L-shaped slot 564 is formed in the other end portion 563 of cam lever 56. Slot 564 is composed of a first slot portion 564a defined by circular arcs described around penetrating hole 561, and a second slot portion 564b extending along the insertion direction X from that end portion of first slot portion 564a which is positioned on the left-hand side of FIG. 19. Slot 564 is wide enough to allow a stopper pin 694 mentioned later to be loosely fitted therein. Cam lever 56 is so regulated as to be able to pivot between a position (a thirteenth position) where stopper pin 694 is located at the left-hand end portion of first slot portion 564a and a position (a fourteenth position) where stopper pin 694 abuts on the right-hand end edge of first slot portion 564a. When cam lever 56 is in the thirteenth position, the slider 310, which is coupled with cam lever 56 by means of coupling lever 33, is located in the tenth position, so that cradle 18 is held in the second position. When cam lever 56 is in the fourteenth position, on the other hand, slider 310 and cradle 18 are held in the ninth and first positions, respectively.

A cam portion 565 is formed on the left-hand side of the other end portion of cam lever 56. Cam portion 565 is so designed as not to engage roller 22 of opening mechanism 20 when cam lever 56 is in the thirteenth position, and to stand in the path of roller 22 moving from the third position to the fourth position to engage roller 22 when cam lever 56 is in the fourteenth position. As roller 22 engages cam portion 565, cam lever 56 is returned from the fourteenth position to the thirteenth position against the urging force of spring 58. A bank portion 567 extends on and along the right-hand side edge of the other end portion of cam lever 56.

A penetrating hole 571 is formed substantially in the central portion of stop lever 57. Stop lever 57 is rotatably mounted on pin 55 fitted in hole 571. A regulating portion 572 is formed at one end portion of stop lever 57 on the side of roller 22. The other end portion 573 of stop lever 57 extends close to bank portion 567 of cam lever 56 so as to be able to engage bank portion 567. One end portion of a coupling member 60 is rockably mounted on the other end portion 573 of stop lever 57. The other end portion of coupling member 60 is pivotally mounted on an eccentric mounting pin 66 of a cam gear 62 mentioned later. The pivotal position of stop lever 57 around pin 55 is regulated by the pivotal position of cam gear 62.

A cylindrical member 621 is attached to the central portion of the upper surface of cam gear 62, and a penetrating hole is bored through cylindrical member 621 and cam gear 62. Cam gear 62 is rotatably mounted on mounting chassis 41 by means of a pin 61 attached thereto and passed through the penetrating hole. Cylindrical member 621 is connected to the other end of wire 21. Wire 21 is supported in the middle by a pulley 64. A gear portion 622 is formed on the outer peripheral surface of cam gear 62. Cam gear 62 is mounted in such a position that worm wheel 46 meshes with gear portion 622 when plunger 421 of solenoid 42 is in the eleventh position, and that worm wheel 46 does not mesh with gear portion 622 when plunger 421 is in the twelfth position.

Another cylindrical member 624 for mounting pin 66 is formed at that portion of the upper surface of cam gear 62 which is deviated at a given distance from the central portion of cam gear 62. Also, a projection 623 is fixed to that portion of the upper surface of cam gear 62 which is at a given counterclockwise angular distance from cylindrical member 624. Projection 623 is connected with the other end of tension spring 58. Tension spring 58 urges cam gear 62 to rock clockwise.

Cam gear 62 is stopped from rotating clockwise by a stop mechanism (not shown) to act against the urging force of tension spring 58, and is held in a stop position. In the stop position, stop lever 57, whose pivotal position depends on that of cam gear 62, is held in a fifteenth position. When stop lever 57 is in the fifteenth position, bank portion 567 of cam lever 56 abuts on the other end portion 573 of stop lever 57, and cam lever 56 is held in the thirteenth position. When stop lever 57 is in the fifteenth position, moreover, regulating portion 572 at the one end portion of stop lever 57 stands in the movement path of roller 22 of opening mechanism 20. As roller 22 engages regulating portion 572, opening mechanism 20 is prevented from moving from the third position to the fourth position.

When cam gear 62 rotates counterclockwise from the stop position, bank portion 567 of cam lever 56 is caused to strike against the other end portion 573 of stop lever 57 by the urging force of spring 58, thereby pivotal cam lever 56 counterclockwise from the thirteenth position to the fourteenth position. When cam lever 56 reaches the fourteenth position, stop lever 57 and cam gear 62 reach a sixteenth position and an intermediate position, respectively. In this state, cam lever 56 is prevented from pivotal counterclockwise as stopper pin 694 abuts on the right-hand end edge of first slot portion 564a. Accordingly, when cam gear 62 rocks further counterclockwise from the intermediate position, stop lever 57 rocks further pivots counterclockwise, though cam lever 56 is held in the fourteenth position. When cam gear 62 reaches a limit position for its counterclockwise pivoting, stop lever 57 is held in a seventeenth position. When stop lever 57 is in the seventeenth position, there is a predetermined space between the other end portion 573 of stop lever 57 and bank portion 567 of cam lever 56.

Accompanying the counterclockwise pivoting of cam gear 62, projection 623 engages and pulls wire 21 stretched between cylindrical member 621 and lower finger 192 of holding device 19. Pulley 64 is so located that projection 623 engages wire 21 when cam gear 62 reaches the intermediate position. Thus, wire 21 is pulled as cam gear 62 is pivoted counterclockwise from the intermediate position to the limit position.

A spring bearing roller 63 is rockably mounted by means of a pin 65 on that portion of the upper surface of cam gear 62 which is at a given clockwise angular distance from cylindrical member 624. Roller 63 is intended to engage and pull tension spring 58 when cam gear 62 pivots counterclockwise from the stop position.

A cam disc 625 is coaxially fixed to the lower surface of cam gear 62. A depression 626 is formed at a part of the outer periphery of cam disc 625. A first microswitch 67 is attached to that portion of mounting chassis 41 which faces depression 626 when cam gear 62 is in the stop position.

First microswitch 67 is provided for electrically detecting cam gear 62 being in the stop position by means of its cantilever falling into depression 626. Further, a second microswitch 68 is attached to that portion of mounting chassis 41 which faces depression 626 when cam gear 62 is in the limit position. Second microswitch 68 is provided for electrically detecting cam gear 62 being in the limit position by means of its cantilever falling into depression 626.

A toggle lever 69 is rotatably mounted on that portion of mounting chassis 41 which is located under the other end portion of cam lever 56. Toggle lever 69 has a substantially L-shaped plane configuration, and has a penetrating hole 691 at its bent portion. A pin 70 is passed through hole 691, and the lower end of pin 70 is supported by a bearing 415 attached to mounting chassis 41 so that toggle lever 69 is rotatably supported on mounting chassis 41. A pair of lugs 692 and 693 are formed at one end portion of toggle lever 69. Lugs 692 and 693 are arranged at a given space on a circular arc around pin 70. When one lug 692 is located in the path of roller 22 of opening mechanism 20 to be allowed to engage roller 22, other lug 693 is not allowed to engage roller 22, and vice versa. Toggle lever 69 is located in an eighteenth position when one lug 692 is allowed to engage roller 22, and is located in a nineteenth position when other lug 693 is allowed to engage roller 22. Stopper pin 694 is fixed to the upper surface of toggle lever 69.

The other end portion 695 of toggle lever 69 is connected to one end of a toggle spring 71. The other end of toggle spring 71 is conencted to a bent strip 416 formed on mounting chassis 41. Toggle spring 71 urges toggle lever 69 toward the eighteenth or nineteenth position. When toggle lever 69 is in the eighteenth position, stopper pin 694 is in first slot portion 564a and allows cam lever 56 to pivot between the thirteenth and fourteenth positions. When cam lever 56 is in the thirteenth position, stopper pin 694 can move into second slot portion 564b, and toggle lever 69 is allowed to pivot between the eighteenth and nineteenth positions. When toggle lever 69 is in the nineteenth position, cam lever 56 is held in the thirteenth position.

Referring now to FIGS. 21 to 26, there will be described the driving operation of drive mechanism 30 of the above-mentioned construction in conjunction with FIGS. 7 to 15.

Figure 21:
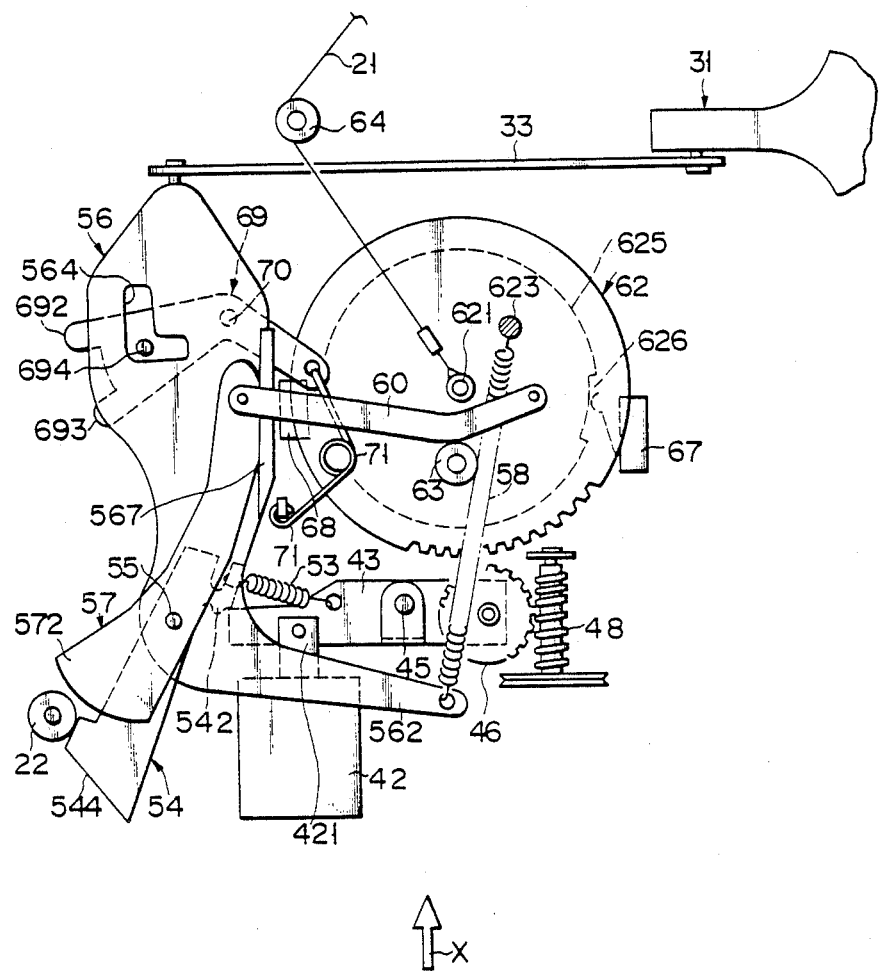
FIG. 21 is a plan view showing the drive mechanism in the clutch-OFF state.

FIG. 21 shows a state before the system power is turned on. Since solenoid 42 is not energized, plunger 421 is urged to be held in the twelfth position by spring 53. Accordingly, worm wheel 46 and cam gear 62 are not in mesh, and cam gear 62 is urged to be held in the stop position by spring 58. This is a clutch-OFF state. Stop lever 57 is held in the fifteenth position by cam gear 62, while cam lever 56 is held in the thirteenth position by stop lever 57. In this state, roller 22 is prohibited from moving from the third position to the fourth position, regulated by regulating portion 572 of stop lever 57. Namely, when the system power is turned off, casing 14 is prevented from being inserted into housing 11 through inlet slot 13. Since cam lever 56 is in the thirteenth position, slider 310 is in the tenth position, and the bearing surface of cradle 18 is held in the second position below the loading surface of turntable 17, as shown in FIG. 18. Since wire 21 is not pulled by projection 623 of cam gear 62, lower finger 192 of holding device 19 is urged toward the sixth position by spring 39, as shown in FIG. 5.

Figure 22:
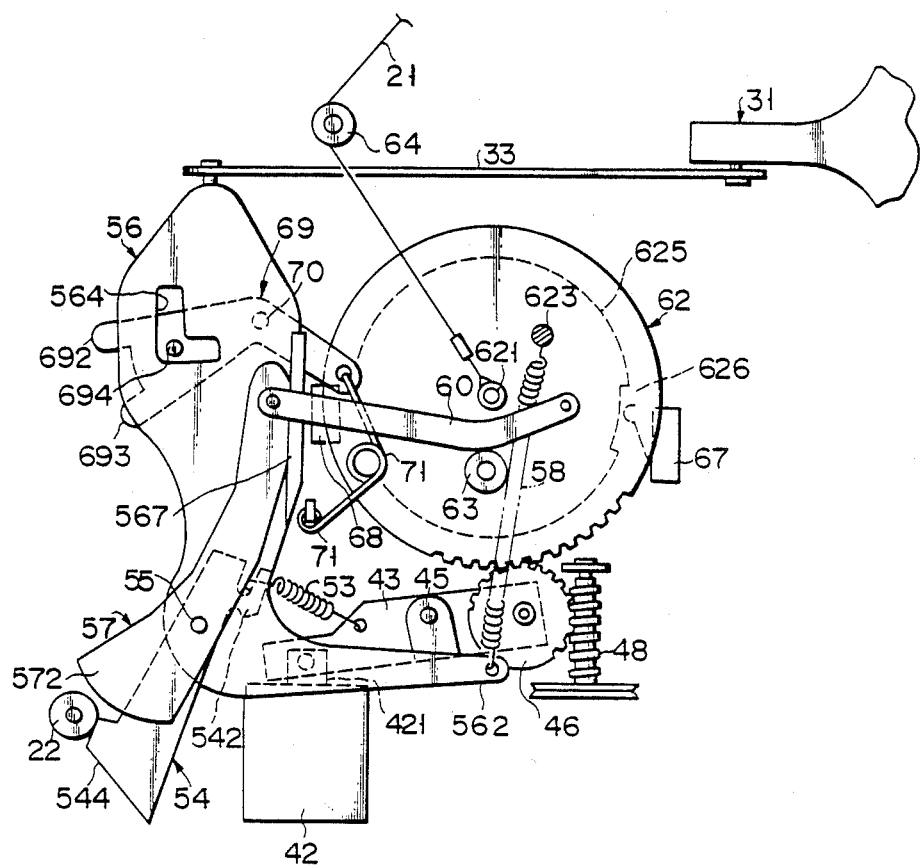
FIG. 22 is a plan view showing the drive mechanism in the clutch-ON state.

When the power is turned on in the state shown in FIG. 21, solenoid 42 is energized, and plunger 421 is urged to move from the twelfth position to the eleventh position. Accordingly, solenoid lever 43 is rocked counterclockwise around pin 45 against the urging force of spring 53, and worm wheel 46 meshes with cam gear 62, as shown in FIG. 22. In this state, the rotatory force of motor 51 is allowed to be transmitted to cam gear 62. This is a clutch-ON state.

Figure 23:
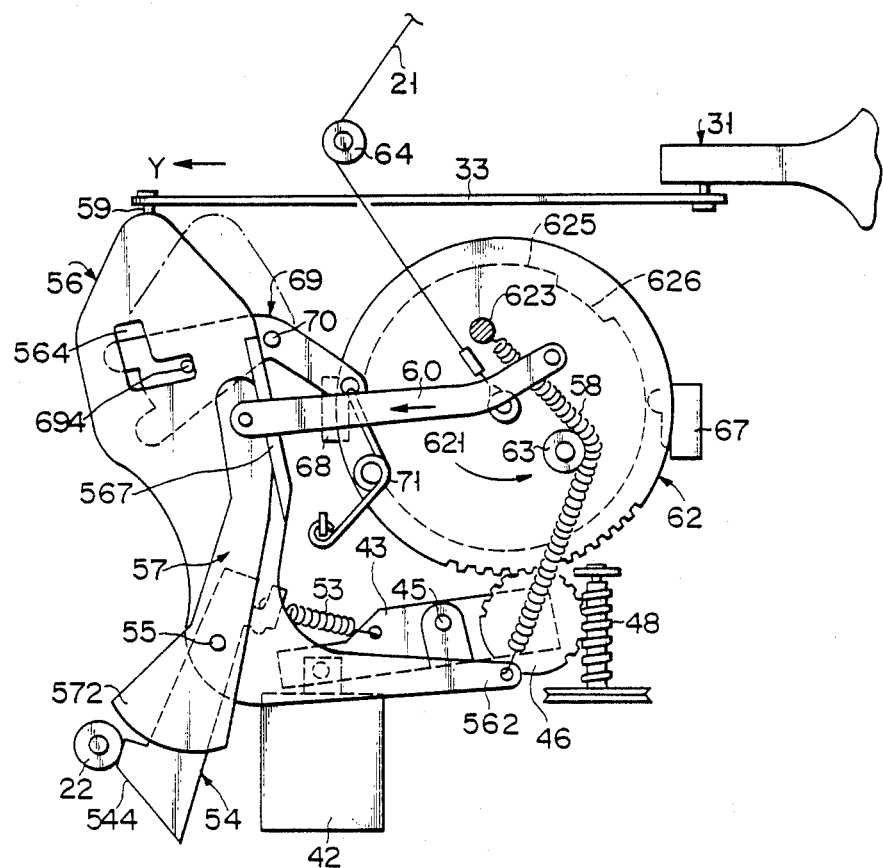
FIG. 23 is a plan view showing the drive mechanism in such a state that a cam gear 62 is located at an intermediate position.

After solenoid 42 is energized, motor 51 is started to drive driving shaft 512 in one direction, so that cam gear 62 is pivoted counterclockwise to the intermediate position against the urging force of spring 58, as shown in FIG. 23. As cam gear 62 pivots in this manner, stop lever 57 is pivoted from the fifteenth position to the sixteenth position, so that cam lever 56 is pivoted from the thirteenth position to the fourteenth position. As cam lever 56 pivots in this manner, coupling lever 33 is moved in the direction indicated by the arrow Y, and slider 310 is moved from the tenth position to the ninth position. Accompanying such movement of slider 310, cradle 18 moves from the second position to the first position. As cam gear 62 pivots from the intermediate position to the limit position, stop lever 57 pivots from the sixteenth position to the seventeenth position, though cam lever 56 is held in the fourteenth position through engagement with stopper pin 694. When stop lever 57 is brought to the seventeenth position, regulating portion 572 is removed from the movement path of roller 22, so that roller 22 is allowed to move, that is, opening mechanism 20 is allowed to move from the third position to the fourth position. In other words, casing 14 is allowed to be inserted into housing 11 through inlet slot 13.

Figure 24:
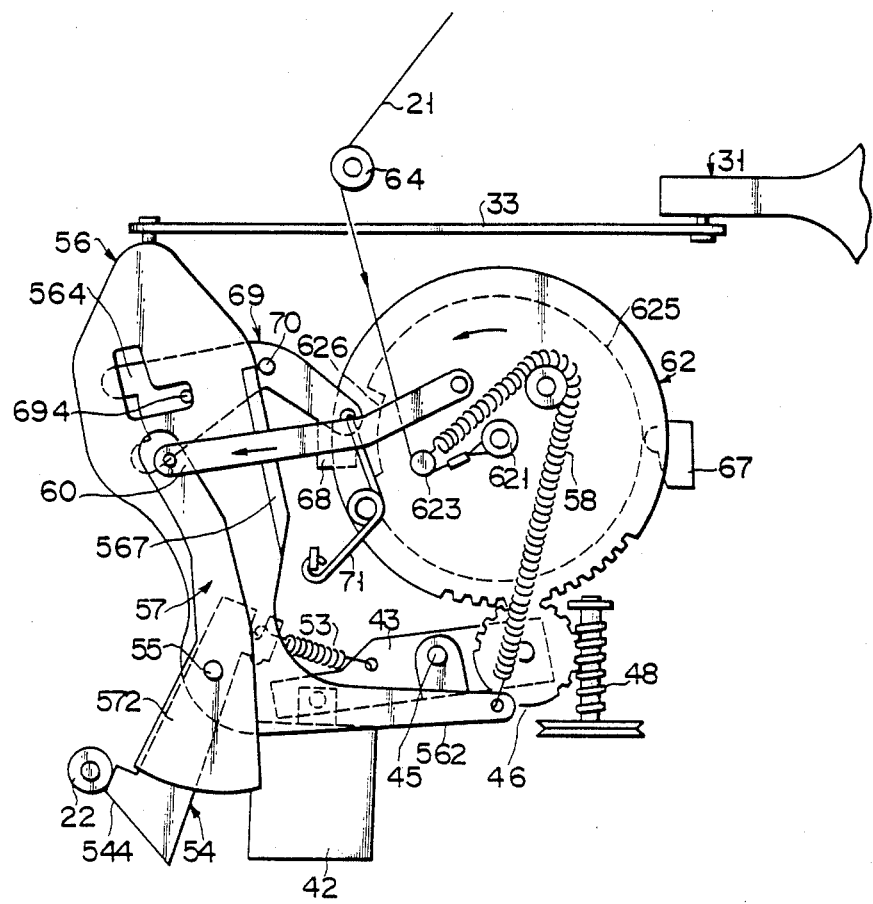
FIG. 24 is a plan view showing the drive mechanism in such a state that the cam gear 62 is located at a limit position.

As cam gear 62 pivots from the intermediate position to the limit position, projection 623 of cam gear 62 engages and pulls wire 21, as shown in FIG. 24. As a result, lower finger 192 of holding device 19 is pivoted from the sixth position to the fifth position against the urging force of spring 39, and gets ready to receive disc 15 being inserted between itself and upper finger 191. When of cam gear 62 reaches the limit position, it is detected by second microswitch 68 when the drive of motor 51 is stopped. The state shown in FIG. 24 corresponds to the state shown in FIG. 7, which is a stand-by state for the insertion of casing 14. After the drive of motor 51 is stopped, cam gear 62 is held in the limit position through the engagement between worm 48 and worm wheel 46 although it is urged to pivot clockwise by spring 58.

Figure 25:
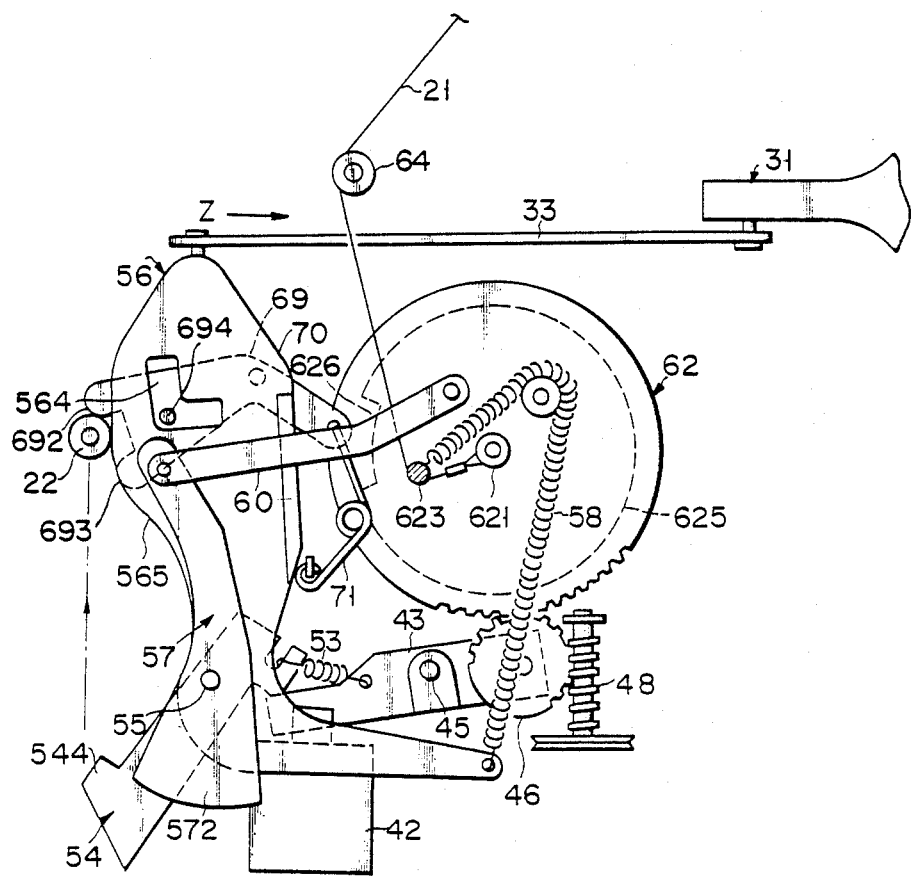
FIG. 25 is a plan view showing the drive mechanism in such a state that a roller 22 engages a cam lever 56.
Figure 26:
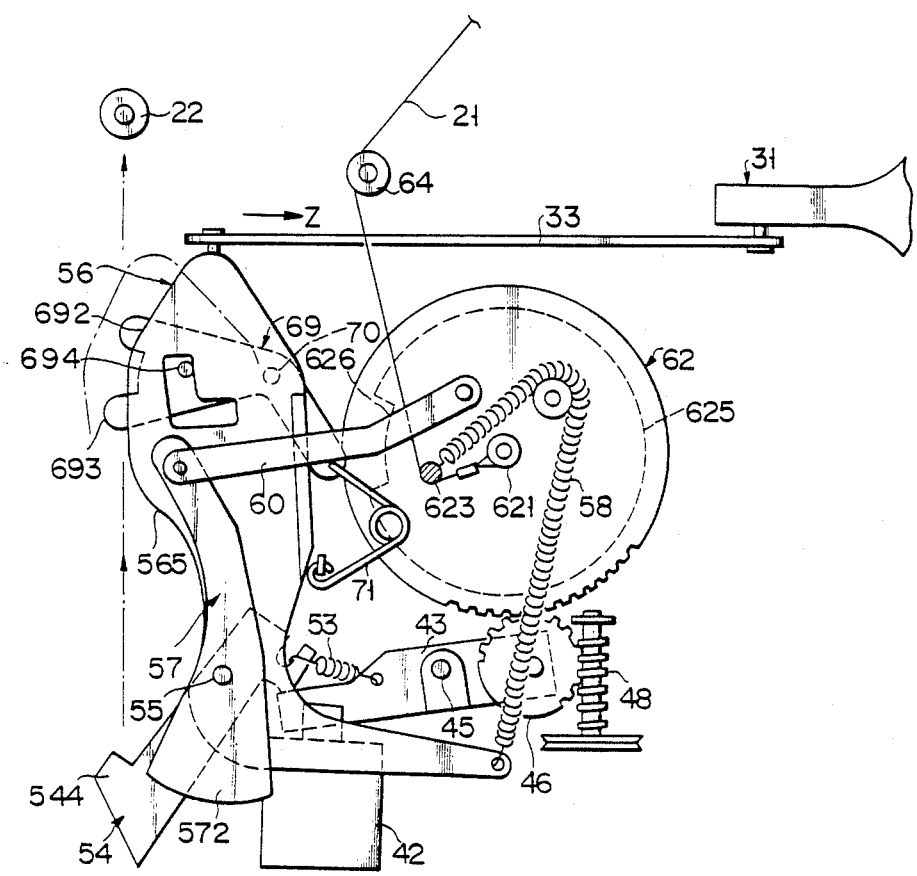
FIG. 26 is a plan view showing the drive mechanism in such a state that the cam lever 56 is stopped by a toggle lever 69.

If casing 14 is inserted into the housing 11 in the state shown in FIG. 24, opening mechanism 20 moves from the third position to the fourth position while widening opening 141 of casing 14, as described before. Thereupon, when roller 22 of opening mechanism 20 moves in the direction indicated by the arrow X accompanying the insertion of casing 14, as shown in FIG. 25, roller 22 first engages cam portion 565 of cam lever 56, so that only cam lever 56 is forced to return from the fourteenth position to the thirteenth position against the urging force of spring 58. Based on the aforementioned connections, cradle 18 is lowered from the first position to the second position. The state of FIG. 25 corresponds to the state shown in FIG. 10. When roller 22 is moved from the third position, as shown in FIG. 25, cam portion 544 of lock lever 54 is released from the regulation by roller 22. Accordingly, lock lever 54 is pivoted clockwise by the urging force of spring 53, and engaging portion 542 of lock lever 54 engages one end portion of solenoid lever 43 to hold solenoid lever 43 in the eleventh position. Thereafter, roller 22 is further inserted in the direction indicated by the arrow X to engage one lug 692 of toggle lever 69 to shift toggle lever 69 from the eighteenth position to the nineteenth position. As a result, stopper pin 694 of toggle lever 69 moves into second slot portion 564b of cam lever 56, and cam lever 56 is held in the thirteenth position, as shown in FIG. 26.

Then, after going through the state shown in FIG. 11, disc 15 is held by holding device 19 in the aforementioned manner, and casing 14 is drawn out of housing 11. By the removal of casing 14, roller 22 of opening mechanism 20 is moved in the opposite direction to the direction indicated by the arrow X to engage other lug 693 of toggle lever 69, thereby moving toggle lever 69 from the nineteenth position to the eighteenth position. By the removal of casing 14, moreover, roller 22 is disengaged from cam portion 565 of cam lever 56. Thus, cam lever 56 is set free, and is pivoted from the thirteenth position to the fourteenth position by spring 58. Namely, cradle 18 rises from the second position to the first position, and the central portion of disc 15 contained in housing 11 is received by cradle 18, as shown in FIG. 12.

When casing 14 is entirely removed from housing 11, as shown in FIG. 13, roller 22 returns to the third position to provide a playback stand-by state, as shown in FIG. 24. In this state, lock lever 54 is pressed against roller 22, and engaging portion 542 of lock lever 54 is separated from one end portion of solenoid lever 43 against the urging force of spring 53. If an operator gives an instruction for the playback operation in this state, motor 51 is first driven so as to rotate driving shaft 512 in the other direction. Since solenoid 42 is kept energized, the engagement between worm wheel 46 and cam gear 62 is maintained, and cam gear 62 is pivoted clockwise from the limit position toward the intermediate position. As cam gear 62 pivots to the intermediate position, projection 623 pulling wire 21 gradually relaxes its pull, and finally ceases to pull wire 21 when cam gear 62 reaches the intermediate position shown in FIG. 23. Namely, lower finger 192 of holding device 19 rocks from the fifth position to the sixth position to release its hold of the lower surface of the outer peripheral portion of disc 15. Even if cam gear 62 then pivots from the limit position to the intermediate position, disc cradle 18 will be held in the first position because stop lever 57 is pivoted from the seventeenth position only up to the sixteenth position. Thus, even though the lower surface of the outer peripheral portion of disc 15 is released from the support by holding device 19, the central portion of disc 15 is still supported by cradle 18.

Subsequently, as cam gear 62 pivots from the intermediate position to the stop position, stop lever 57 is pivoted from the sixteenth position to the fifteenth position, and cam lever 56 is pivoted from the fourteenth position to the thirteenth position through the engagement between other end portion of stop lever 57 and bank portion 567 of cam lever 56 to reach the position shown in FIG. 22. Namely, cradle 18 is lowered from the first position to the second position, and disc 15 is laid on turntable 17, as shown in FIG. 15. The return of cam gear 62 to the stop position is detected by first microswitch 67, then the drive of motor 51 is stopped.

Thereafter, turntable 17 is rotated, and pickup arm 23 moved to start the prescribed playback operation. When the prescribed playback operation is completed and pickup arm 23 is returned to the start position, motor 51 is rotated again in one direction in order to take out disc 15 from housing 11. According to the aforementioned processes of operation, cradle 18 first rises from the second position to the first position, and then lower finger 192 of holding device 19 rises from the sixth position to the fifth position to support the lower surface of the outer peripheral edge of disc 15 in the first position thereof. In this state, empty casing 14 is inserted into the housing, and disc 15, along with lid plate 16, is housed in casing 14 in the aforementioned manner. Then, disc 15 is removed from housing 11 as casing 14 is drawn out of housing 11.

Thereupon the system power supply of player 10 is turned off, and a series of processes of reproducing operation is completed.

If the state shown in FIG. 13 is maintained for several minutes during the removal of disc 15, then motor 51 is driven by a motor driver (FIG. 28) to rotate in the other direction to restore the state shown in FIG. 15. Accordingly, disc 15 will never be left in the state of FIG. 1 for a long period of time thereby preventing warping of disc 15.

According to this embodiment, even if the system power supply is turned off by mistake in the state shown in FIG. 13 during the removal of disc 15, the state shown in FIG. 15 can be restored automatically. If the system power is turned off by mistake in the state shown in FIGS. 13 or 24, solenoid 42 is not energized. Accordingly, plunger 421 is moved from the eleventh position to the twelfth position by the urging force of spring 53. Accompanying such movement, solenoid lever 43 pivots clockwise around pin 45, and worm wheel 46 is separated and hence disengaged from cam gear 62. Therefore, cam gear 62 is pivoted clockwise by the urging force of spring 58, and is returned to the stop position.

In short, if the system power supply is turned off by mistake in the state shown in FIG. 24, player 10 is automatically restored to the state show in FIG. 21 by the urging force of spring 58. Thus, warping of disc 15 is prevented due to faulty or mistaken termination of the system power supply.

According to the embodiment, as described in detail herein, when solenoid 42 is energized, cam gear 62 is caused to mesh with worm wheel 46 so that the driving force of motor 51 can be transmitted thereby. When solenoid 42 is not energized, cam gear 62 and worm wheel 46 are out of mesh and cannot transmit the power of motor 51, and cam gear 62 is allowed to rotate freely. With use of such an arrangement, cam gear 62 may be returned by the urging force of spring 58 to the stop position where disc 15 is allowed to be laid on turntable 17, in case of faulty termination of the power supply. Thus, disc 15 is prevented from being warped due to a prolonged stay on disc cradle 18.

Although cam gear 62 is always urged by spring 58 to return to the stop position, it will never be caused actually to do so by the urging force of spring 58 while solenoid 42 is energized due to the use of worm 48 and worm wheel 46 in the power transmission mechanism mesh with one another.

Thus, without the use of any special lock mechanism for cam gear 62, the position of cam gear 62 with solenoid 42 energized can be securely maintained.

When roller 22 of opening mechanism 20 is in the third position near inlet slot 13, that is, when casing 14 is not inserted in housing 11 yet, lock lever 54 regulated by roller 22 is separated from solenoid lever 43, which is urged by spring 53 to pivot in the direction to separate worm wheel 46 from cam gear 62. Therefore, worm wheel 46 is caused to mesh with cam gear 62 against the urging force of spring 53 when solenoid 42 is energized, and is separated from cam gear 62 by spring 53 when solenoid 42 is not energized. When roller 22 leaves the third position, that is, when at least the forward end of casing 14 is put in housing 11, lock lever 54 ceases to be regulated by roller 22 and is caused to engage solenoid lever 43 by the urging force of spring 53, thereby locking solenoid lever 43. Accordingly, even if the power supply is mistakenly terminated while at least part of casing 14 remains in housing 11, plunger 421 is held in the eleventh position, and the engagement between worm wheel 46 and cam gear 62 is maintained. Namely, even if the system power supply is mistakenly terminated while casing 14 is being inserted for the removal of disc 15, disc cradle 18 will be held in the first position to allow disc 15 to be housed securely in casing 14. Thus, disc cradle 18 is allowed to automatically return to the second position in case of faulty termination of the system power supply only when casing 14 is kept outside housing 11. This positively maintains the reliability of operation.

Common tension spring 58 can provide both the force of cam gear 62 to return to the stop position and the force of cam lever 56 to pivot counterclockwise from the thirteenth position to the fourteenth position.

Further, the position of cam lever 56, which is shifted from the fourteenth position to the thirteenth position by the movement of roller 22 of opening mechanism 20 from the third position to the fourth position accompanying the insertion of casing 14, is held by toggle lever 69 which is shifted from the eighteenth position to the nineteenth position by the aforesaid movement of roller 22. As roller 22 moves from the fourth position to the third position accompanying the removal of casing 14, toggle lever 69 is shifted from the nineteenth position to the eighteenth position, so that cam lever 56 is released from the hold by toggle lever 69, and returns from the thirteenth position to the fourteenth position. Thus, disc cradle 18 can smoothly descend and ascend as casing 14 is inserted into or removed from housing 11.

If stop lever 57 is in the fifteenth position where disc cradle 18 is restricted to the lower second position, that is, if the system power is turned off or disc 15 is already placed on turntable 17, regulating portion 572 of stop lever 57 is disposed in the movement path of roller 22 to prevent roller 22 from moving from the third position to the fourth position. Thus, casing 14 may be prevented from being inserted in player 10 while player 10 is not in the standby state for reproduction or is in the middle of a playback operation. This leads to an improvement in safety.

Figure 27:
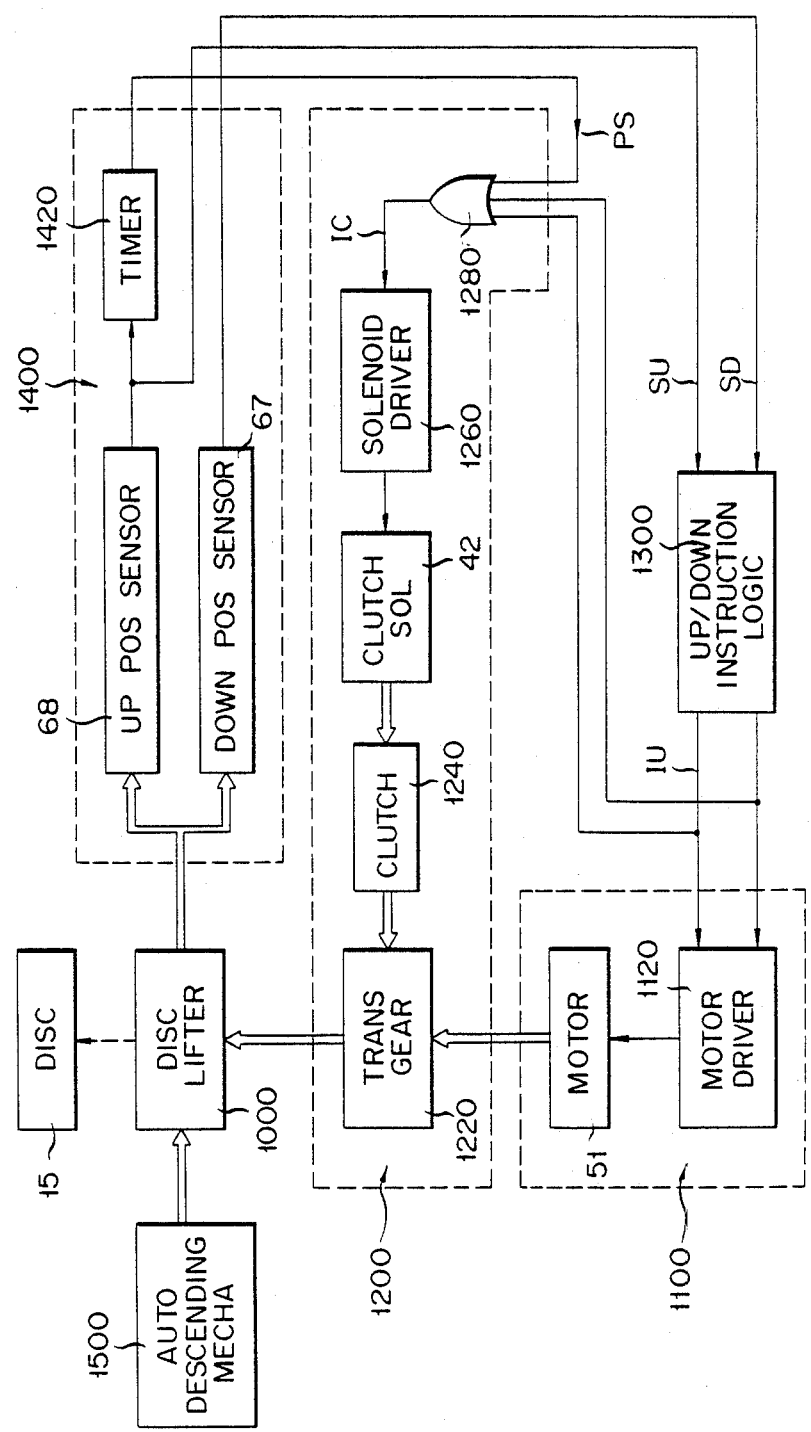
FIG. 27 shows a schematic block diagram of a control system of the invention.

FIG. 27 shows a schematic block diagram of a control system of the invention.

Cradle 18 for lifting disc 15 is operatively coupled to cam gear 62 via elements 31, 33, 56, 57 and 60 (FIGS. 16 to 26). The elements 31, 33, 56, 57, 60 and 62 form actuator means, and the actuator means accompanied with cradle 18 form lifter means or a disc lifter 1000. Gear 62 is coupled via elements 46, 48, 50 and 511 to motor 51 (FIG. 19). The elements 62, 46 and 48 jointly constitute gear means or a transmission gear assembly 1220. Worm wheel 46 is coupled via solenoid lever 43 and plunger 421 to clutch solenoid 42. The elements 421, 43 and 46 form clutch means or a clutch mechanism 1240. Solenoid 42 is energized by amplifier means or a solenoid driver 1260, and driver 1260 is excited by a clutch-ON instruction IC obtained from logical OR means or an OR gate 1280. The elements 1220, 1240, 42, 1260 and 1280 form transmission means 1200.

Up position sensor 68 and down position sensor 67 are coupled to cam gear 62 of lifter 1000. Sensor 68 may be a microswitch which is turned on when cradle 18 reaches to a given position at which disc 15 placed on cradle 18 is lifted up (FIGS. 17, 24), and sensor 68 generates an up position signal SU at said given position. Sensor 67 may also be a microswitch which is turned on when cradle 18 reaches to another given position at which disc 15 disposed on cradle 18 is just placed onto turntable 17 (FIGS. 18, 22), and sensor 67 generates a down position signal SD at said another given position.

Signal SU is applied to a timer 1420. Timer 1420 may be a counter or a one-shot multivibrator triggered by signal SU. Immediately after the triggering, timer 1420 generates a position singal PS for a given period of time, e.g., four to five minutes. Sensors 67, 68 and timer 1420 form sensor means 1400 for providing a position signal PS for a given period of time when lifter 1000 reaches to a given position at which disc 15 placed on cradle 18 is lifted up.

The actuation of motor 51 is controlled by a motor driver 1120. How the driver 1120 controls the motor 51 depends on an up instruction IU and a down instruction ID. Motor 51 and driver 1120 form power means 1100 for generating drive power which is used for ascending or descending the cradle 18. Motor 51 generates a first drive power for ascending cradle 18 according to up instruction IU and generates a second drive power for descending cradle 18 according to down instruction ID.

Up and down instructions IU and ID are obtained from instruction means or an up/down instruction logic 1300. Logic 1300 provides up instruction IU by the up manipulation of a user and stops the supply of instruction IU upon receipt of said up position signal SU. Similarly, logic 1300 provides down instruction ID by the down manipulation of a user and stops the supply of instruction ID upon receipt of said down position signal SD.

Instructions IU and ID are applied to motor driver 1120 and OR gate 1280. Applied also to gate 1280 is the position signal PS. When any of signals IU, ID and PS has logical "1", gate 1280 provides driver 1260 with said clutch-ON instruction IC. Then, driver 1260 excites solenoid 42 so that clutch 1240 (solenoid 42) engages worm wheel 46 with worm 48 and cam gear 62. In this case, the drive power derived from motor 51 is effectively transmitted to cradle 18 of lifter 1000.

The cam gear 62 of lifter 1000 is provided with tension spring 58 (FIG. 20). Where solenoid 42 is energized and clutch 1240 engages worm wheel 46 with worm 48 and cam gear 62, drive power for, e.g., ascending cradle 18 of lifter 1000 is applied via transmission gear 1220 to gear 62 of lifter 1000. Then, gear 62 is rotated by the drive power of counterclockwise direction and cradle 18 is lifted up. In this case, spring 58 is stretched out (FIGS. 17, 24). When all of signals IU, ID and PS become logical "0", driver 1260 stops the energizing of solenoid 42. Then, clutch 1240 releases the engaging of the gear elements 46, 48 and 62. Here, since gear 62 is free from wheel 46, gear 62 is rotated in a clockwise direction by the resilient force of spring 58, and cradle 18 is descended (FIGS. 18, 21). Spring 58 used here functions as an automatic descending mechanism 1500 or means for descending the cradle 18 when the transmission of said drive power is stopped. Cam gear 62 is damped by the viscosity of oil (not shown) in order to realize a smooth descending actuation of cradle 18.

Incidentally, where cam gear 62 is coupled via a reversible power transmission mechanism to cradle 18 and cradle 18 has a certain weight, it is possible, when wheel 46 is separated from gear 62 in the clutch-OFF state, to automatically descend cradle 18 without the resilient force of spring 58.

Figure 28:
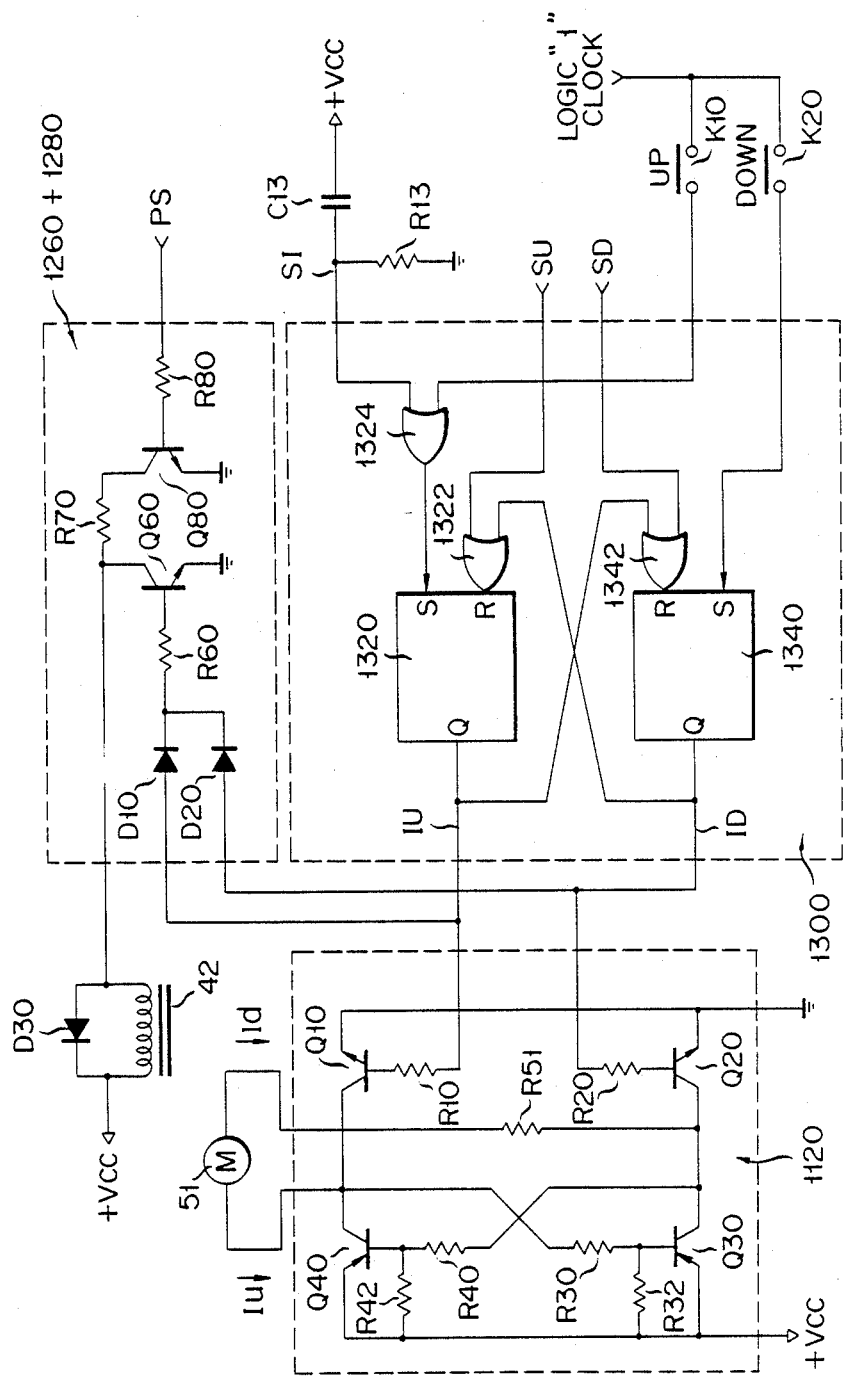
FIG. 28 shows a detailed circuit configuration of an up/down instruction logic 1300, a motor driver 1120 and a solenoid driver 1260 shown in FIG. 27.

FIG. 28 shows details of motor driver 1120, solenoid driver 1260, OR gate 1280 and up/down instruction logic 1300 shown in FIG. 27.

One terminal of DC reversible motor 51 is connected to the collector of an NPN transistor Q10. The other terminal of motor 51 is connected via a resistor R51 to the collector of a PNP transistor Q30. The collector of transistor Q10 is connected to the collector of a PNP transistor Q40, and the collector of transistor Q30 is connected to the collector of an NPN transistor Q20. The emitters of transistors Q10 and Q20 are connected to a circuit ground having a zero potential. Applied to the emitters of transistors Q30 and Q40 are a positive power supply voltage +Vcc. The base of transistor Q30 is coupled via a resistor R30 to the collector of transistor Q40 and also coupled via a resistor R32 to its emitter. The base of transistor Q40 is coupled to the collector of transistor Q30 via a resistor R40 and to its emitter via a resistor R42.

The elements Q10 to Q40 and R30 to R51 as well as elements R10 and R20 (which will be described later) jointly constitute the motor driver 1120.

The base of transistor Q10 is coupled via a resistor R10 to the output Q of RS flip-flop (FF) 1320. The base of transistor Q20 is coupled via a resistor R20 to the output Q of RS-FF 1340. The outputs Q of FF's 1320 and 1340 provide the up and down instructions IU and ID, respectively. Instruction ID is applied to one input of an OR gate 1322 whose output is coupled to the reset input R of FF 1320. The other input of gate 1322 receives the up position signal SU obtained from up position sensor 68. Instruction IU is applied to one input of an OR gate 1342 whose output is coupled to the reset input R of FF 1340. The other input of gate 1342 receives the down position signal SD obtained from down position sensor 67. The set input S of FF 1320 is coupled to the output of an OR gate 1324. One input of gate 1324 is grounded via a resistor R13 and coupled via a capacitor C13 to the circuit of voltage +Vcc. The other input of gate 1324 receives via an up key K10 a clock signal having logical "1" level. The set input S of FF 1340 receives the logical "1" clock via a down key K20. Keys K10 and K20 are manipulated by a user. Each of FF's 1320 and 1340 used here is a set dominant type.

The elements 1320 to 1324 jointly constitute the up-/down instruction logic 1300.

The outputs Q of FF's 1320 and 1340 are connected to the anodes of diodes D10 and D20, respectively. Each cathode of diodes D10 and D20 is coupled via a resistor R60 to the base of an NPN transistor Q60. The collector of transistor Q60 is coupled to one terminal of the winding of solenoid 42. The other terminal of the winding of solenoid 42 is coupled to the circuit with the voltage +Vcc. Connected parallel to the winding of solenoid 42 is a diode D30 for absorbing surges generated by the winding. The connecting direction of diode D30 is such that voltage +Vcc is applied to the cathode of diode D30. The collector of transistor Q60 is coupled via a resistor R70 to the collector of an NPN transistor Q80. The emitters of transistors Q60 and Q80 are grounded. The base of transistor Q80 receives through a resistor R80 the position signal PS which is obtained from timer 1420. Diodes D10 and D20, resistor R60 and transistor Q60 form an OR gate of a diode-transistor logic type. Transistors Q60 and Q80, and resistors R70 and R80 form a wired OR gate of a transistor-transistor logic type.

Transistors Q60 and Q80 also form solenoid driver 1260. Thus, the elements D10, D20, R60, R70, R80, Q60 and Q80 jointly constitute the combination of solenoid driver 1260 and OR gate 1280.

FIG. 29 is a timing chart showing operational sequence of the control system shown in FIGS. 27 and 28.

It is to be assumed for the discussion below that, before time t10, FF's 1320 and 1340 are both reset and cradle 18 is positioned at the lowest position (FIG. 29g). Further it is to be assumed that timer 1420 is not yet triggered and logical level of position signal PS is "0" (FIG. 29j). Under such assumptions, instructions IU, ID and up position signal SU are logical "0" FIG. 29c, d, h) and down position signal SD is logical "1" (FIG. 29i). Before time t10, since transistors Q10 to Q40 are all OFF for IU=ID="0", no current is applied to motor 51 (FIG. 29f). Further, since transistors Q60 and Q80 are both OFF for IU=ID=PS="0", no current is applied to solenoid 42 (FIG. 29e).

When up key K10 is depressed at time t10 (FIG. 29a), FF 1320 is set and instruction IU becomes logical "1" (FIG. 29c). Logical "1" of instruction IU renders transistor Q10, Q30 and Q60 conductive. Then, a collector current I60 of transistor Q60 flows into solenoid 42 (FIG. 29e; t10) and a current Iu flows into motor 51 so that motor 51 generates drive power for ascending cradle 18 (FIG. 29f; t10–t12). Immediately after the start of ascending of cradle 18, since depression 626 (FIG. 22) parts from the cantilever of microswitch 67, sensor 67 ceases the generation of down position signal SD (FIG. 29i; t10).

Cradle 18 gradually ascends by means of ascending drive power derived from motor 51 (FIG. 29g; t10–t12). When cradle 18 reaches to the highest position or the lifted up position (FIG. 29g; t12), the cantilever of microswitch 68 falls in depression 626 (FIG. 24), and sensor 68 generates up position signal SU having logical "1" level (FIG. 29h; t12). Signal SU resets FF 1320 and instruction IU becomes logical "0" (FIG. 29c; t12). Signal SU further triggers timer 1420 and timer 1420 generates position signal PS (FIG. 29j; t12). In this case, transistor Q60 is OFF for IU=ID="0" while transistor Q80 is ON for PS="1", and solenoid 42 is excited by the collector current I80 of transistor Q80. Since transmission gear assembly 1220 no more transmits the drive power, large clutching force is not required. Accordingly, the exciting current for solenoid 42 is reduced from I60 to I80 for saving power consumption of solenoid 42 (FIG. 29e; j12). Such current reduction is effected by resistor R70. Since instructions IU and ID are both logical "0", transistors Q10 to Q40 are OFF and no current is applied to motor 51 (FIG. 29f; t12-t14). Thus, motor 51 is stopped and cradle 18 is retained at the highest position (FIG. 29g; t12-t14).

When down key K20 is depressed at time t14 (FIG. 29b), FF 1340 is set and instruction ID becomes logical "1" (FIG. 29d; t14). Logical "1" of instruction ID renders transistors Q20, Q40 and Q60 conductive. Then, current I60 flows into solenoid 42 (FIG. 29e; t14) and a current Id whose direction is opposite to current Iu flows into motor 51 so that motor 51 generates drive power for descending cradle 18 (FIG. 29f; t14-t16). Immediately after the start of descending of cradle 18, since depression 626 (FIG. 24) parts from the cantilever of microswitch 68, sensor 68 ceases the generation of up position signal SU (FIG. 29h; t14).

Cradle 18 gradually descends by means of descending power obtained from motor 51 (FIG. 29g; t14-t16), the cantilever of microswitch 67 falls in depression 626 (FIG. 22), and sensor 67 generates down position signal SD having logical "1" level (FIG. 29i; t16). Signal SD resets FF 1340 and instruction ID becomes logical "0" (FIG. 29d; t16). In this case transistor Q60 is OFF for IU=ID="0", while transistor Q80 is ON because timer 1420 still generates position signal PS (FIG. 29j; t16). Soneloid 42 is excited by current I80 after time t16 so long as timer 1420 outputs position signal PS (FIGS. 29e, j; t16-t18). When the timer operation ceases, timer 1420 stops the generation of position signal PS, and no current is applied to solenid 42 (FIGS. 29e, j; t18).

When key K10 is depressed at time t20 (FIG. 29a), then FF 1320 is set and instruction IU becomes logical "1" (FIG. 29c), current I60 flows into solenoid 42 (FIG. 29e), and current Iu is applied to motor 51 so that cradle 18 is ascended (FIG. 29f; t20-t22). Immediately after time t20, down position signal SD becomes logical "0" (FIG. 29i). Cradle 18 gradually ascends by means of drive power of motor 51 (FIG. 29g; t20-t22). When cradle 18 reaches to the highest position (FIG. 29g; t22), sensor 68 generates up position singal SU having logical "1" level (FIG. 29h; t22) which resets FF 1320 so that instruction IU becomes logical "0" (FIG. 29c; t22) and the exciting current of solenoid 42 is changed from I60 to I80 (FIG. 29e; t22). Signal SU triggers timer 1420 and position signal PS having logical "1" level is generated for a given period (timer period) of time (FIG. 29j; t22-t28).

After time t22, if key K20 is not depressed, cradle 18 retains the lifted up state (highest position) during the given timer period (e.g., four minutes) unless the system power switch (not shown) is turned off. When the timer period has elapsed, timer 1420 stops to generate position signal PS, i.e., position signal PS becomes logical "0" (FIG. 29j; t28). Since, at this time, instructions IU and ID are logical "0" (FIGS. 29c, d), both transistors Q60 and Q80 are rendered nonconductive and no exciting current is applied to solenoid 42 (FIG. 29e; t28). Then, clutch 1240 releases the engaging of gears of transmission gear asssembly 1220, and cradle 18 is automaticaly descended by the resilient force of spring 58 or by automatic descending mechanism 1500 (FIG. 29g; t28-t30). Immediately after the start of the descending, up position sensor 68 ceases to generate up position signal SU (FIG. 29h; t28). When cradle 18 reaches to the lowest position, down position sensor 67 generates down position signal SD (FIG. 29i; t30). After the completion of the automatic descending actuation of cradle 18, i.e., after time t30, the logical state of each of signals illustrated in FIGS. 29a-29j comes to be identical with that before time t10.

When the system power switch (not shown) is first turned on, the potential change of power supply voltage +Vcc is differentiated by elements C13 and R13, and this potential change is applied as an initializing singal SI to OR gate 1324. This is equivalent when key K10 connected to OR gate 1324 is depressed. Thus, the operational sequence of the clutch control system after the ON of system power is the same as the sequence after time t20 of FIG. 29.

The present invention may be provided in combination with the invention disclosed in U.S. patent application Ser. No. 341,626, titled "MOTOR DRIVE APPARATUS" filed on Jan. 22, 1982 and filed by the applicant herein. All disclosure of said U.S. application No. 341,626 is now incorporated herewith.

Although specific constructions have been illustrated and described herein, it is not intended that the invention be limited to the elements and constructions disclosed. One skilled in the art will recognize that other particular means, elements or subconstructions may be used without departing from the scope of the claimed invention. For instance, turntable 17 may ascend or descend in place of the up/down actuation of cradle 18.

What is claimed is:

1. A control system for a disc player apparatus comprising:
   lifter means for ascending a disc placed thereon to an upper position;
   power means for generating drive power for effecting the ascending of said lifter means;
   transmission means coupled to said lifter means and to said power means for transmitting said drive power to said lifter means;
   instruction means operatively coupled to said power means and said transmission means to supply said power means and said transmission means with an instruction signal, said power means generating said drive power in response to being supplied with said instruction signal;
   sensor means coupled to said lifter means for providing said transmission means with a position signal for a predetermined period of time when said lifter means reaches said upper position, said transmission means transmitting said drive power to said lifter means in response to being provided with at least said position signal or said instruction signal and stopping the transmission of said drive power when said position and instruction signals are not provided; and
   means coupled to said lifter means for descending said disc to a lower position in response to said transmission means stopping the transmission of said drive power.

2. The control system of claim 1, wherein said transmission means includes:
gear means coupled to said power means and to said lifter means for transmitting said drive power;
clutch means coupled to said gear means for enabling the transmission of said drive power when said clutch means is actuated;
solenoid means coupled to said clutch means for actuating said clutch means when said solenoid means is energized; and
driver means coupled to said solenoid means, to said instruction means and to said sensor means, for energizing said solenoid means in response to said position or instruction signals being applied to said driver means.

3. The control system of claim 2, wherein said driver means includes:
first transistor means coupled to said instruction means and to said solenoid means, and being responsive to said instruction signal, for generating a first current when said instruction signal is applied to said first transistor means, said first current energizing said solenoid means; and
second transistor means coupled to said sensor means and to said solenoid means, and being responsive to said position signal, for generating a second current when said position signal is applied to said solenoid means, said second current energizing said solenoid means, and the magnitude of said second current being smaller than that of said first current in order to reduce the power consumption of said solenoid means.

4. The control system of claim 2, wherein said driver means includes:
logical OR means coupled to said sensor means and to said instruction means and being responsive to the logical OR of said position signal and said instruction signal, for generating a clutch-ON signal when said position signal or said instruction signal has logical "1" level; and
amplifier means coupled to said logical OR means for electrically energizing said solenoid means upon receipt of said clutch-ON signal.

5. The control system of claim 4, wherein said instruction means includes an up signal generator for generating an up signal to cause said lifter means to ascend.

6. The control system of claim 5, wherein said sensor means includes:
an up position coupled to said lifter means for sensing said upper position to provide said up signal generator with an up position signal, said up signal generator stopping the generation of said up signal when said up position signal is provided; and
a timer circuit coupled to said position sensor for generating said position signal form the time when said up position signal is provided to the time when said predetermined period of time is elapsed.

7. The control system of claim 6, wherein said instruction means includes a down signal generator for generating a down signal to cause said lifter means to descend from said upper position to said lower position;
and wherein said sensor means includes a down position sensor coupled to said lifter means for sensing said lower position to provide said down signal generator with a down position signal indicating that the disc has just been placed on a turntable on the disc player apparatus, said down signal generator stopping the generation of said down signal when said down position signal is provided.

8. The control system of claim 7, wherein said power means includes:
a motor coupled to said transmission means for generating said drive power; and
a motor driver coupled to said motor, to said up instruction generator and to said down instruction generator, for actuating said motor in one direction upon receipt of said up signal so that the disc ascends, and for actuating said motor in the other direction upon receipt of said down signal so that the disc descends.

9. The control system of any one of claims 1 to 8, wherein said disc player apparatus comprises a turntable for rotating the disc with a given rotational speed;
and said lifter means includes:
a cradle disposed at the central portion of said turntable for ascending and descending the disc according to said drive power, said cradle receiving the disc in the ascended state and placing the disc on said turntable in the descended state; and
actuator means coupled to said cradle for providing said cradle with said drive power which is transmitted from said transmission means.

10. The control system of claim 9, wherein said sensor means is coupled to said actuator means.

11. The control system of claim 9, wherein said descending means includes resilient means coupled to said actuator means for descending said cradle when the transmission of said drive power is stopped.

12. The control system of claim 9, wherein said descending means includes means coupled to said actuator means for descending said cradle by means of the gravity when the transmission of said drive power is stopped.

* * * * *